(12) United States Patent
Tsuruta

(10) Patent No.: US 12,038,044 B2
(45) Date of Patent: Jul. 16, 2024

(54) ROLLING BEARING

(71) Applicant: NIPPON THOMPSON CO., LTD., Tokyo (JP)

(72) Inventor: Kenichiro Tsuruta, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 17/764,251

(22) PCT Filed: Sep. 25, 2020

(86) PCT No.: PCT/JP2020/036333
§ 371 (c)(1),
(2) Date: Mar. 28, 2022

(87) PCT Pub. No.: WO2021/060489
PCT Pub. Date: Apr. 1, 2021

(65) Prior Publication Data
US 2022/0373022 A1 Nov. 24, 2022

(30) Foreign Application Priority Data
Sep. 27, 2019 (JP) ................................. 2019-177931

(51) Int. Cl.
*F16C 19/36* (2006.01)
*F16C 33/58* (2006.01)
(Continued)

(52) U.S. Cl.
CPC ............ *F16C 19/362* (2013.01); *F16C 33/58* (2013.01); *F16C 33/60* (2013.01); *F16C 33/64* (2013.01)

(58) Field of Classification Search
CPC ........ F16C 19/16; F16C 19/166; F16C 19/36; F16C 19/362; F16C 33/58; F16C 33/588;
(Continued)

(56) References Cited

U.S. PATENT DOCUMENTS 3,343,895 A * 9/1967 Morrison ................ F16C 33/60
29/898.063
3,630,584 A * 12/1971 McKee ................. F16C 19/163
384/469
(Continued)

FOREIGN PATENT DOCUMENTS

DE 371438 C * 4/1923
DE 102017106195 B3 6/2018
(Continued)

OTHER PUBLICATIONS

DE371438_C_DESCRIPTION.*

*Primary Examiner* — Phillip A Johnson
(74) *Attorney, Agent, or Firm* — Browdy and Neimark, PLLC

(57) ABSTRACT

A rolling bearing 1 includes an outer ring 1A, an inner ring 1B, and a plurality of rolling elements. The outer ring IA includes a first outer ring 10 and a second outer ring 20. The inner ring 1B includes a first inner ring 30 and a second inner ring 40. In a cross section including a central axis R, grain flows 111 in the steel constituting the first outer ring 10 extend along a first rolling surface 511, grain flows 211 in the steel constituting the second outer ring 20 extend along a second rolling surface 512, grain flows 311 in the steel constituting the first inner ring 30 extend along a third rolling surface 513, and grain flows 411 in the steel constituting the second inner ring 40 extend along a fourth rolling surface 514.

11 Claims, 19 Drawing Sheets

(51) Int. Cl.
*F16C 33/60* (2006.01)
*F16C 33/64* (2006.01)

(58) Field of Classification Search
CPC ...... F16C 33/60; F16C 33/64; F16C 2223/12; F16C 2223/16
See application file for complete search history.

(56) References Cited

U.S. PATENT DOCUMENTS

| | | | |
|---|---|---|---|
| 3,960,419 A * | 6/1976 | Brawley | F16C 33/605 384/571 |
| 4,362,344 A | 12/1982 | Lederman | |
| 4,368,932 A * | 1/1983 | Wolzenburg | F16C 33/7886 384/607 |
| 4,722,616 A * | 2/1988 | Lederman | F16C 33/588 384/515 |
| 6,390,685 B1 | 5/2002 | Shimomura et al. | |
| 2010/0327686 A1 | 12/2010 | Gardelle et al. | |
| 2018/0026648 A1 | 1/2018 | Kris et al. | |

FOREIGN PATENT DOCUMENTS

| | | | |
|---|---|---|---|
| JP | 60170547 A | 9/1985 | |
| JP | 2001065574 A | 3/2001 | |
| JP | 2011503461 A | 1/2011 | |
| JP | 201744268 A | 3/2017 | |

\* cited by examiner

ROLLING BEARING

TECHNICAL FIELD

The present invention relates to a rolling bearing. The present application claims priority based on Japanese Patent Application No. 2019-177931 filed on Sep. 27, 2019, the entire contents of which are incorporated herein by reference.

BACKGROUND ART

A rolling bearing having rolling elements arranged on a single raceway and having two sets of rolling surfaces facing each other is known (see, for example, Patent Literature 1).

CITATION LIST

Patent Literature

Patent Literature 1: Japanese Patent Application Laid-Open No. 2017-044268

SUMMARY OF INVENTION

Technical Problem

It is preferable for the above rolling bearing to have sufficient durability. Therefore, one of the objects is to provide a rolling bearing with improved durability.

Solution to Problem

A rolling bearing according to the present disclosure includes: an outer ring made of steel; an inner ring made of steel arranged on an inner circumferential side of the outer ring; and a plurality of rolling elements arranged to be capable of rolling on an inner circumferential surface of the outer ring and an outer circumferential surface of the inner ring. The outer ring includes a first outer ring having an annular first rolling surface that constitutes the inner circumferential surface of the outer ring, and a second outer ring having an annular second rolling surface that has a common central axis with the first rolling surface and constitutes the inner circumferential surface of the outer ring, the second outer ring being arranged alongside the first outer ring in a first axis direction in which the central axis of the first rolling surface extends and being fixed to the first outer ring. The inner ring includes a first inner ring having an annular third rolling surface that has a common central axis with the first rolling surface, opposes the second rolling surface, and constitutes the outer circumferential surface of the inner ring, and a second inner ring having an annular fourth rolling surface that has a common central axis with the first rolling surface, opposes the first rolling surface, and constitutes the outer circumferential surface of the inner ring, a line segment connecting the fourth rolling surface and the first rolling surface intersecting a line segment connecting the second rolling surface and the third rolling surface in a cross section including the central axis of the first rolling surface, the second inner ring being arranged alongside the first inner ring in the first axis direction and being fixed to the first inner ring. In the cross section including the central axis of the first rolling surface, grain flows in the steel constituting the first outer ring extend along the first rolling surface, grain flows in the steel constituting the second outer ring extend along the second rolling surface, grain flows in the steel constituting the first inner ring extend along the third rolling surface, and grain flows in the steel constituting the second inner ring extend along the fourth rolling surface.

Advantageous Effects of Invention

According to the above-described rolling hearing, durability can be improved.

BRIEF DESCRIPTION OF DRAWINGS

FIG. 21 is a schematic perspective view showing the variation of the rolling bearing in Embodiment 5.

DESCRIPTION OF EMBODIMENTS

Outline of Embodiments

Figure 1:
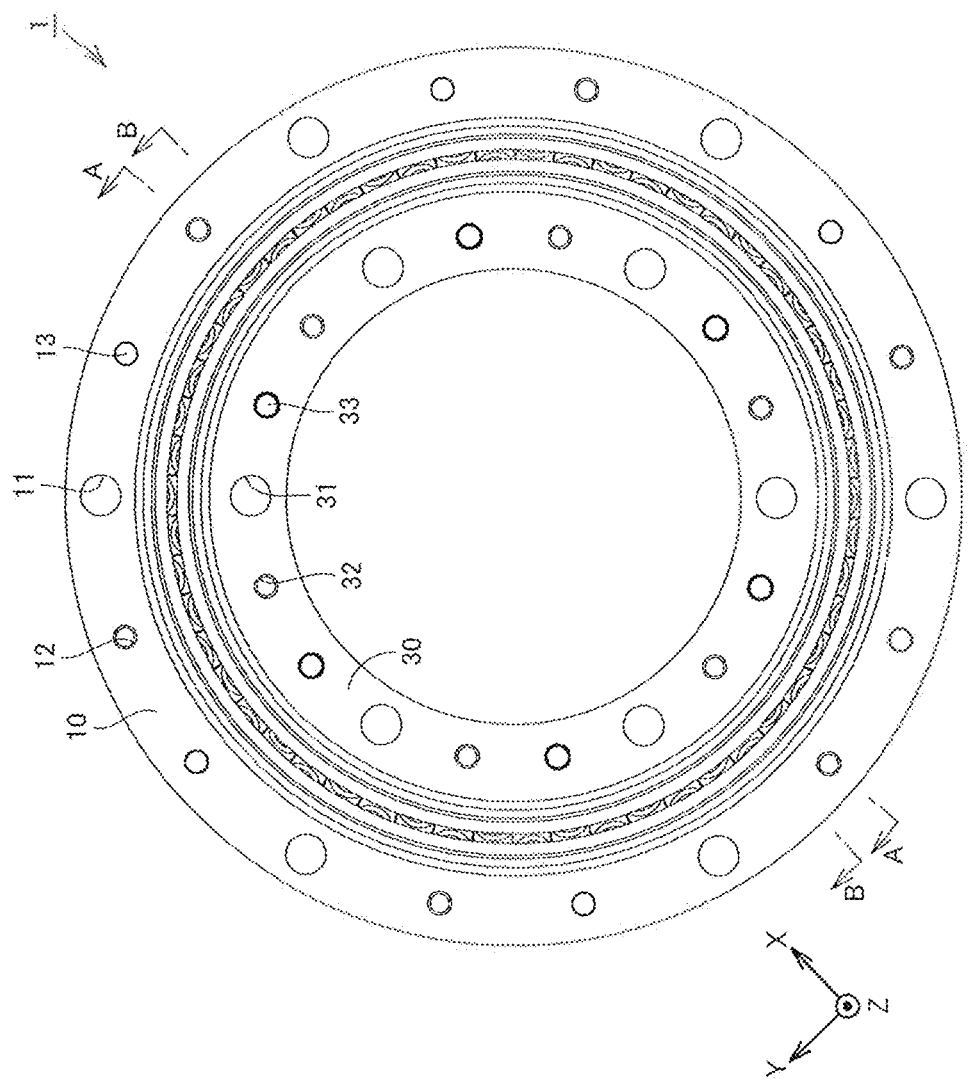
FIG. 1 is a schematic plan view showing the structure of a rolling bearing in Embodiment 1.

First, embodiments of the present disclosure will be listed and described. A rolling bearing of the present disclosure includes: an outer ring made of steel; an inner ring made of steel arranged on an inner circumferential side of the outer ring; and a plurality of rolling elements arranged to be capable of rolling on an inner circumferential surface of the outer ring and an outer circumferential surface of the inner ring. The outer ring includes a first outer ring having an annular first rolling surface that constitutes the inner circumferential surface of the outer ring, and a second outer ring having an annular second rolling surface that has a common central axis with the first rolling surface and constitutes the inner circumferential surface of the outer ring, the second outer ring being arranged alongside the first outer ring in a first axis direction in which the central axis of the first rolling surface extends and being fixed to the first outer ring. The inner ring includes a first inner ring having an annular third rolling surface that has a common central axis with the first rolling surface, opposes the second rolling surface, and constitutes the outer circumferential surface of the inner ring, and a second inner ring having an annular fourth rolling surface that has a common central axis with the first rolling surface, opposes the first rolling surface, and constitutes the outer circumferential surface of the inner ring, a line segment connecting the fourth rolling surface and the first rolling surface intersecting a line segment connecting the second rolling surface and the third rolling surface in a cross section including the central axis of the first rolling surface, the second inner ring being arranged alongside the first inner ring in the first axis direction and being fixed to the first inner ring. In the cross section including the central axis of the first rolling surface, grain flows in the steel constituting the first outer ring extend along the first rolling surface, grain flows in the steel constituting the second outer ring extend along the second rolling surface, grain flows in the steel constituting the first inner ring extend along the third rolling surface, and grain flows in the steel constituting the second inner ring extend along the fourth rolling surface.

The present inventors studied measures to improve the durability of rolling bearings. In the rolling bearing disclosed in Patent Literature 1, the rolling surfaces are subjected to grinding to improve the dimensional accuracy of the rolling surfaces. Grinding work thus performed on the rolling surfaces may cause ends of the steel grain flows to be exposed on the rolling surfaces, in such a case, it was found that although the dimensional accuracy of the rolling surfaces would be improved, the durability of the inner and outer rings would be reduced due to the contact of the rolling elements with the ends of the steel grain flows.

In the rolling bearing of the present disclosure, in a cross section including the central axis of the first rolling surface, the grain flows in the steels constituting the first outer ring, the second outer ring, the first inner ring, and the second inner ring extend along the first rolling surface, the second rolling surface, the third rolling surface, and the fourth rolling surface, respectively. The steel grain flows extending along the first, second, third, and fourth rolling surfaces in the above-described manner can suppress the contact of the rolling elements with the ends of the steel grain flows. This results in improved durability of the inner and outer rings. As such, according to the rolling bearing of the present disclosure, the durability can be improved.

In the above rolling bearing, the rolling elements may include first rollers and second rollers. The first rollers and the second rollers may be arranged alternately in a circumferential direction. The first rollers may have a central axis intersecting a central axis of the second rollers. The first rollers may be arranged so as to be able to roll on the first rolling surface and the fourth rolling surface. The second rollers may be arranged so as to be able to roll on the second rolling surface and the third rolling surface. With the rolling elements including the first and second rollers as described above, a rolling bearing suitable for supporting loads applied in a plurality of directions can be obtained.

In the above rolling bearing, the rolling elements may be balls. The rolling elements may be arranged so as to be able to roll on the first rolling surface, the second rolling surface, the third rolling surface, and the fourth rolling surface. With this, the rotational resistance of the rolling bearing can be reduced.

In the above rolling bearing, the first outer ring may include a first portion having a disk annular shape, a second portion having a tubular shape and having an annular inner circumferential surface, the second portion extending from an inner edge of the first portion such that an inner diameter of the second portion decreases with increasing distance from the first portion in the first axis direction, and a third portion having a cylindrical shape, being connected to an end of the second portion opposite to the first portion in the first axis direction, and extending along the first axis direction. The second outer ring may include a fourth portion having a disk annular shape and being fixed to the first portion such that main surfaces thereof contact each other, a fifth portion having a tubular shape and having an annular inner circumferential surface, the fifth portion extending from an inner edge of the fourth portion to a side opposite to the second portion in the first axis direction, the fifth portion having an inner diameter decreasing with increasing distance from the fourth portion, and a sixth portion having a cylindrical shape, being connected to an end of the fifth portion opposite to the fourth portion in the first axis direction, and extending along the first axis direction to a side opposite to the third portion. The first inner ring may include a seventh portion having a disk annular shape, an eighth portion having a tubular shape and having an annular outer circumferential surface, the eighth portion extending from an outer edge of the seventh portion such that an outer diameter of the eighth portion increases with increasing distance from the seventh portion in the first axis direction, and a ninth portion having a cylindrical shape, being connected to an end of the eighth portion opposite to the seventh portion in the first axis direction, and extending along the first axis direction. The second inner ring may include a tenth portion having a disk annular shape and being fixed to the seventh portion such that main surfaces thereof contact each other, an eleventh portion having a tubular shape and having an annular outer circumferential surface, the eleventh portion extending from an outer edge of the tenth portion to a side opposite to the eighth portion in the first axis direction such that an outer diameter of the eleventh portion increases with increasing distance from the tenth portion, and a twelfth portion having a cylindrical shape, being connected to an end of the eleventh portion opposite to the tenth portion in the first axis direction, and extending along the first axis direction to a side opposite to the ninth portion. The inner circumferential surface of the second portion may include the first rolling surface. The inner circumferential surface of the fifth portion may include the second rolling surface. The outer circumferential surface of the eighth portion may include the third rolling surface. The outer circumferential surface of the eleventh portion may include the fourth rolling surface.

The first outer ring, the second outer ring, the first inner ring, and the second inner ring with such configurations can readily be produced, for example, by press forming steel plates. Therefore, the production cost of the rolling bearing can be reduced.

In the above rolling bearing, in a cross section including the central axis of the first roller, an effective contact length $L_1$ between an outer circumferential surface of the first roller and the first rolling surface and an effective contact length $L_2$ between the outer circumferential surface of the first roller and the fourth rolling surface may be not less than 0.5 times and not more than 0.9 times a length of the first roller in the axial direction. In a cross section including the central axis of the second roller, an effective contact length $L_3$ between an outer circumferential surface of the second roller and the second rolling surface and an effective contact length $L_4$ between the outer circumferential surface of the second roller and the third rolling surface may be not less than 0.5 times and not more than 0.9 times a length of the second roller in the axial direction. With the effective contact lengths $L_1$ and $L_2$ having the above range, the frictional force between the first roller and the first and fourth rolling surfaces can be reduced. With the effective contact lengths $L_3$ and $L_4$ having the above range, the frictional force between the second roller and the second and third rolling surfaces can be reduced. Therefore; the increase in rotational torque due to the first and second rollers can be suppressed.

In the above rolling bearing, in a cross section including the central axis of the first rolling surface, the main surface of the first portion on the side in contact with the fourth portion and the first rolling surface may be connected via a curved first region. The main surface of the fourth portion on the side in contact with the first portion and the second rolling surface may be connected via a curved second region. An annular space may be formed, enclosed by the first region, the second region, and the rolling elements.

The annular space as described above can be filled with a lubricant. Therefore, the possibility of occurrence of oil film shortage between the first roller and the first rolling surface and between the second roller and the second rolling surface can be reduced.

In the above rolling bearing, in a cross section including the central axis of the first rolling surface, the first rolling surface and an inner circumferential surface of the third portion may be connected via a curved third region. The third rolling surface and an inner circumferential surface of the ninth portion may be connected via a curved fourth region. By the first outer ring including the third region as described above, the concentration of stress caused by contact between the third region and the rolling elements can be reduced. Similarly, by the first inner ring including the fourth region as described above, the concentration of stress caused by contact between the fourth region and the rolling elements can be reduced.

In the above rolling bearing, in a cross section including the central axis of the first rolling surface, the first portion, the second portion, the third portion, the fourth portion, the fifth portion, the sixth portion, the seventh portion, the eighth portion, the ninth portion, the tenth portion, the eleventh portion, and the twelfth portion may have a thickness that is less than 0.5 times a diameter of the rolling elements. With this, the first outer ring, the second outer ring, the first inner ring, and the second inner ring can be reduced in weight.

In the above rolling bearing, an inner circumferential surface of the third portion and an outer circumferential surface of the ninth portion may be located to oppose each other. An inner circumferential surface of the sixth portion and an outer circumferential surface of the twelfth portion may be located to oppose each other. In a cross section including the central axis of the first rolling surface, a distance in a radial direction between the third portion and the ninth portion may be smaller than a thickness of the third portion, and a distance in the radial direction between the sixth portion and the twelfth portion may be smaller than a thickness of the sixth portion. Such a configuration can reduce the entry of foreign matter into the space enclosed by the first outer ring, the second outer ring, the first inner ring, and the second inner ring from a gap formed between the third portion and the ninth portion and a gap formed between the sixth portion and the twelfth portion.

In the above rolling bearing, in a cross section including the central axis of the first rolling surface, the third portion and the ninth portion may each have a length in the first axis direction that is greater than 1.5 times a thickness of the third portion, and the sixth portion and the twelfth portion may each have a length in the first axis direction that is greater than 1.5 times a thickness of the sixth portion. With this, when mounting the first outer ring, the second outer ring, the first inner ring, and the second inner ring of the rolling bearing to another member, the outer circumferential surface of the third portion, the outer circumferential surface of the sixth portion, the inner circumferential surface of the ninth portion, and the inner circumferential surface of the twelfth portion serve as reference surfaces to facilitate the mounting.

In the above rolling bearing, the first outer ring may further include a labyrinth portion arranged at an end of the third portion opposite to the second portion in the first axis direction and bent radially inward of the third portion to oppose the ninth portion with a spacing therebetween, the spacing being smaller than a distance between the third portion and the ninth portion in the radial direction. The inclusion of such a labyrinth portion can further reduce the entry of foreign matter into the space enclosed by the first outer ring, the second outer ring, the first inner ring, and the second inner ring from the gap formed between the third portion and the ninth portion.

In the above rolling bearing, the first inner ring may further include a labyrinth portion arranged at an end of the ninth portion opposite to the eighth portion in the first axis direction and bent radially outward of the ninth portion to oppose the third portion with a spacing therebetween, the spacing being smaller than a distance between the third portion and the ninth portion in the radial direction. The inclusion of such a labyrinth portion can further reduce the entry of foreign matter into the space enclosed by the first outer ring, the second outer ring, the first inner ring, and the second inner ring from the gap formed between the third portion and the ninth portion.

In the above rolling hearing, the first outer ring may include a first portion of a disk annular shape, and an inner circumferential surface of the first portion may include the first rolling surface. The second outer ring may include a fourth portion fixed to the first portion such that main surfaces thereof contact each other, and an inner circumferential surface of the fourth portion may include the second rolling surface. The first inner ring may include a seventh portion of a disk annular shape, and an outer circumferential surface of the seventh portion may include the third rolling surface. The second inner ring may include a tenth portion of a disk annular shape fixed to the seventh portion such that main surfaces thereof contact each other, and an outer circumferential surface of the tenth portion may include the fourth rolling surface. With the inner circumferential surfaces of the disk annular portions of the first and second outer rings including the rolling surfaces and the outer circumferential surfaces of the disk annular portions of the first and second inner rings including the rolling surfaces, a thin rolling bearing is obtained.

In the above rolling bearing, the first outer ring and the first inner ring may have their surfaces formed to be flat with no protruding portion in the first axis direction. The second outer ring and the second inner ring may have their surfaces formed to be flat with no protruding portion in the first axis direction. With the surfaces of the rolling bearing being flat, an even thinner rolling bearing is obtained. Further, with the absence of protruding portions, a counterpart to which the rolling bearing is to be mounted does not need to undergo machining or the like for the purpose of avoiding interference with the protruding portions. This makes the rolling bearing more convenient to install.

Description of Specific Embodiments

Specific embodiments of the rolling bearing of the present disclosure will be described below with reference to the drawings. In the drawings referenced below, the same or corresponding portions are denoted by the same reference numerals and the description thereof will not be repeated.

Embodiment 1

Figure 2:
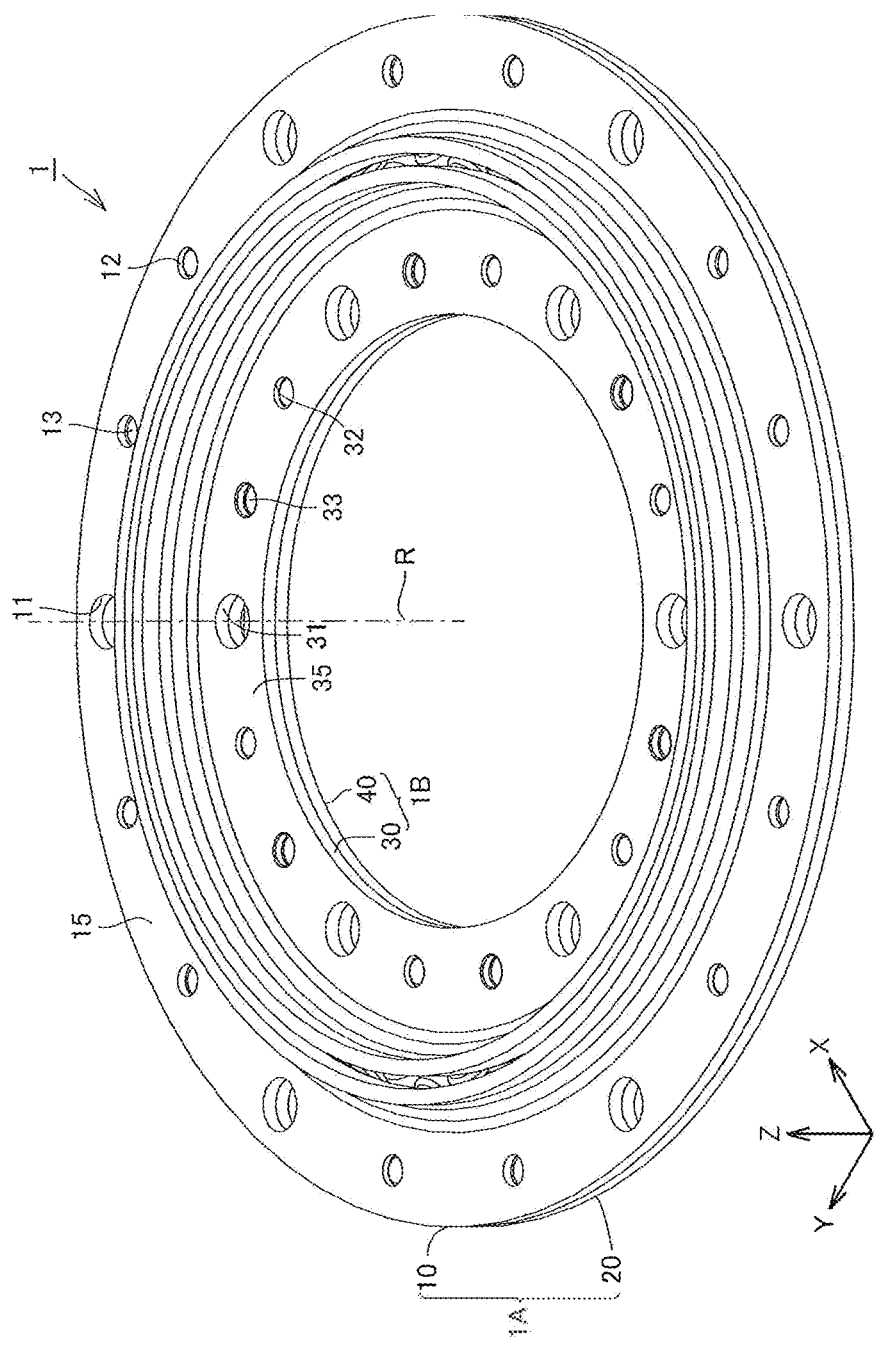
FIG. 2 is a schematic perspective view showing the structure of the rolling bearing in Embodiment 1.
Figure 3:
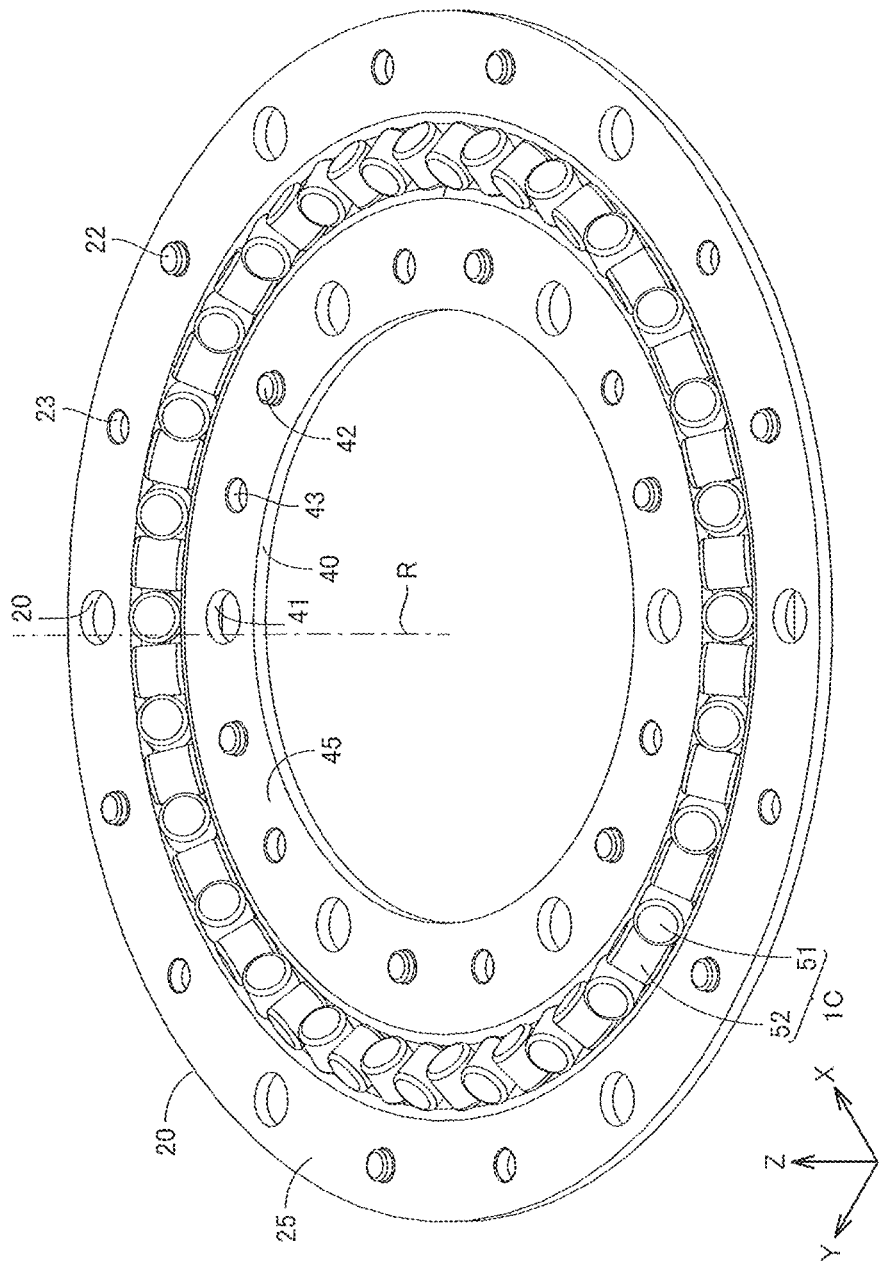
FIG. 3 is a schematic perspective view showing the structure of the rolling bearing with the first outer ring and the first inner ring removed.

FIG. 1 is a schematic plan view showing the structure of a rolling bearing in an embodiment of the present disclosure. The Z axis direction in FIG. 1 is a direction along a first axial direction in which a central axis R of the rolling bearing extends. Referring. FIGS. 1 to 3, the rolling bearing 1 in Embodiment 1 includes an outer ring 1A, an inner ring 1B, and a plurality of rollers 1C as rolling elements. The outer ring 1A and the inner ring 1B are made of steel. The inner ring 1B is placed on an inner circumferential side of the outer ring 1A. In the present embodiment, the outer ring 1A and the inner ring 1B are made of steel plates that have been worked into a predetermined shape. In the present embodiment, the steel that constitutes the outer ring 1A and the inner ring 1B is, for example, SCM415 specified in HS standard.

Figure 4:
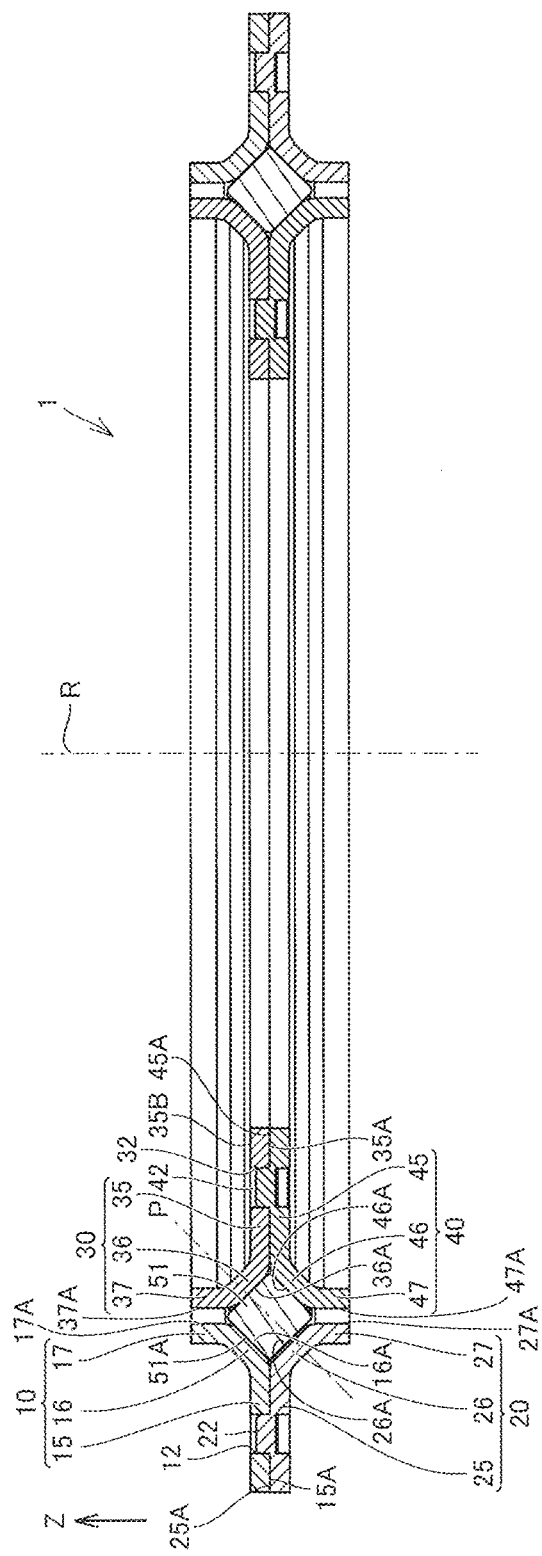
FIG. 4 is a schematic cross-sectional view showing the structure of the rolling bearing in Embodiment 1.
Figure 5:
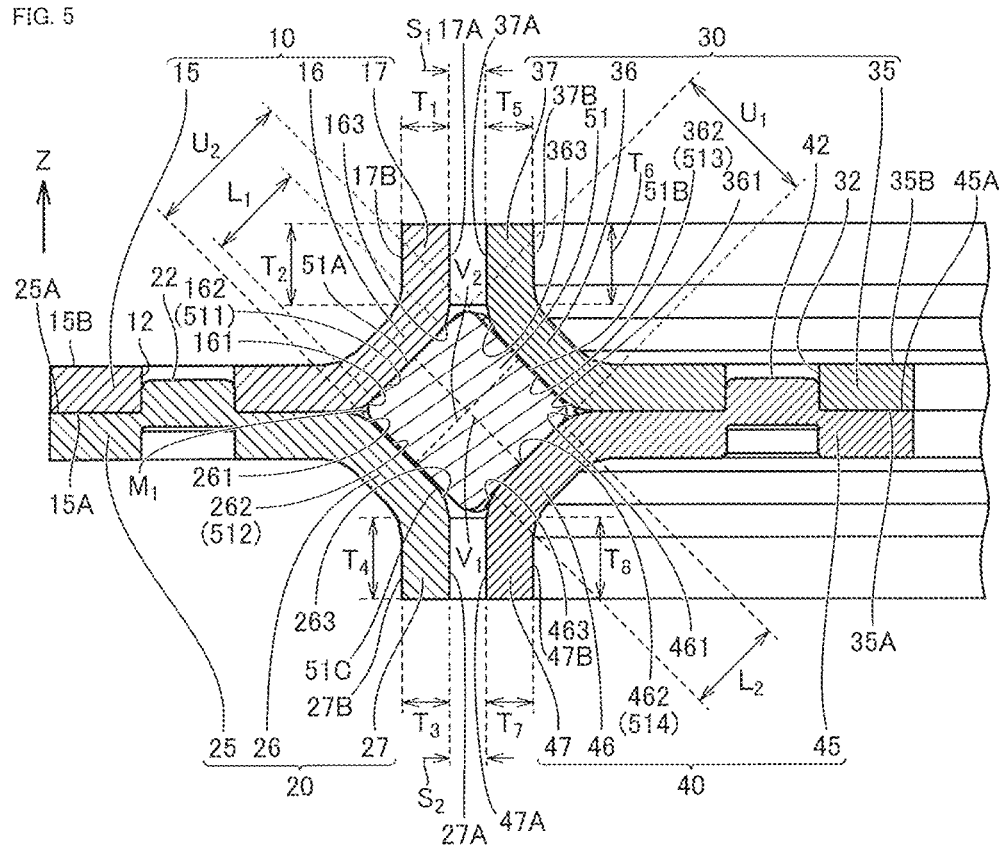
FIG. 5 is a schematic cross-sectional view showing the structure of the rolling bearing in Embodiment 1.

FIG. 4 is a cross-sectional view of the rolling bearing 1 when cut at A-A in FIG. 1. FIG. 4 is a cross-sectional view including the central axis of a first roller, Which will be described later. FIG. 5 is a cross-sectional diagram showing, in an enlarged view, the area around the first roller in FIG. 4, Referring to FIGS. 2 and 4, the outer ring 1A includes an annular first outer ring 10 and an annular second outer ring 20. In the present embodiment, the first outer ring 10 and the second outer ring 20 have the same shape. Referring to FIGS. 4 and 5, the first outer ring 10 includes a first portion 15, a second portion 16, and a third portion 17. In the present embodiment, the first portion 15, the second portion 16, and the third portion 17 have the same thickness $T_1$. The first portion 15 has a disk annular shape. The first portion 15 has a common central axis with the central axis P. of the rolling bearing 1. The second portion 16 has a tubular shape. The external shape of the second portion 16 is a truncated cone shape. The second portion 16 extends from an inner edge of the first portion 15 such that its inner diameter decreases with increasing distance from the first portion 15 in the Z axis direction. The second portion 16 has an annular inner circumferential surface 16A. The inner circumferential surface 16A has a common central axis with the central axis R of the rolling bearing 1. The third portion 17 has a cylindrical shape. The third portion 17 has a common central axis with the central axis R of the rolling bearing 1. The third portion 17 is connected to an end of the second portion 16 opposite to the first portion 15 in the Z axis direction and extends along the Z axis direction.

The inner circumferential surface 16A includes an annular first surface 161 as a first region, an annular second surface 162, and an annular third surface 163 as a third region. In the present embodiment, the first surface 161, the second surface 162, and the third surface 163 have a common central axis with the central axis R of the rolling bearing 1. The first surface 161 connects a surface 15A of the first portion 15 on the side in contact with a fourth portion 25 to the second surface 162. In the present embodiment, in a cross section including the central axis R, the first surface 161 has a curved shape. In the cross section including the central axis R, the second surface 162 has a flat shape. The third surface 163 connects the second surface 162 to an inner circumferential surface 17A of the third portion 17. In the present embodiment, in the cross section including the central axis R, the third surface 163 has a curved shape. In the present embodiment, the third portion 17 has a length $T_2$ in the Z axis direction in the cross section including the central axis R that is greater than 1.5 times the thickness $T_1$ of the third portion 17. The length $T_2$ of the third portion 17 in the Z axis direction is preferably not more than five times the thickness $T_1$ of the third portion 17, The thickness $T_1$ of the third portion 17 in the present embodiment is, for example, about 1 mm.

Referring to FIGS. 2 and 4, the first portion 15 has a plurality of (in the present embodiment, six) mounting holes 11, penetrating in the thickness direction (Z axis direction), formed at equal intervals in the circumferential direction. In the first portion 15, a protruding portion 13 and a through hole 12 are formed side by side in the circumferential direction between adjacent mounting holes 11 in the circumferential direction. A plurality of (in the present embodiment, six) protruding portions 13, protruding in the thickness direction (Z axis direction) from the surface 15A of the first portion 15, are formed at equal intervals in the circumferential direction. A plurality of (in the present embodiment, six) through holes 12, penetrating in the thickness direction (Z axis direction), are formed at equal intervals in the circumferential direction.

Referring to FIGS. 4 and 5, the second outer ring 20 is arranged alongside the first outer ring 10 in the Z axis direction and is fixed to the first outer ring 10. The second outer ring 20 includes a fourth portion 25, a fifth portion 26, and a sixth portion 27. In the present embodiment, the fourth portion 25, the fifth portion 26, and the sixth portion 27 have the same thickness $T_3$. In the present embodiment, the thickness $T_3$ coincides with the thickness $T_1$. The fourth portion 25 has a disk annular shape. The surface 15A of the first portion 15 is in contact with one surface 25A of the fourth portion 25. The fourth portion 25 has a common central axis with the central axis R of the rolling bearing 1. The fifth portion 26 has a tubular shape. The external shape of the fifth portion 26 is a truncated cone shape. The fifth portion 26 extends from an inner edge of the fourth portion 25 such that its inner diameter decreases with increasing distance from the fourth Sit portion 25 in the Z axis direction. The fifth portion 26 extends to the opposite side of the second portion 16 in the Z axis direction. The fifth portion 26 has an inner circumferential surface 26A of an annular shape. The inner circumferential surface 26A has a common central axis with the central axis R of the rolling bearing 1. The sixth portion 27 has a cylindrical shape. The sixth portion 27 has a common central axis with the central axis R of the rolling bearing 1. The sixth portion 27 is connected to an end of the fifth portion 26 opposite to the fourth portion 25 in the Z axis direction and extends along the Z axis direction to the opposite side of the third portion 17.

The inner circumferential surface 26A includes an annular fourth surface 261 as a second region, an annular fifth surface 262, and an annular sixth surface 263. The fourth surface 261, the fifth surface 262, and the sixth surface 263 have a common central axis with the central axis R of the rolling bearing 1. The fourth surface 261 connects the surface 25A of the fourth portion 25 to the fifth surface 262. In the cross section including the central axis R, the fourth surface 261 has a curved shape. In the cross section including the central axis R, the fifth surface 262 has a flat shape. The sixth surface 263 connects the fifth surface 262 to an inner circumferential surface 27A of the sixth portion 27. In the cross section including the central axis R, the sixth surface 263 has a curved shape. In the present embodiment, in the cross section including the central axis R, the sixth portion 27 has a length $T_4$ in the Z axis direction that is greater than 1.5 times the thickness $T_3$ of the sixth portion 27. The length $T_4$ of the sixth portion 27 in the Z axis direction is preferably not more than five times the thickness $T_3$ of the sixth portion 27. The thickness $T_3$ of the sixth portion 27 in the present embodiment is, for example, about 1 mm.

Referring to FIGS. 3 and 4, the fourth portion 25 has a plurality of (in the present embodiment, six) mounting holes 21, penetrating in the thickness direction (Z axis direction), formed at equal intervals in the circumferential direction. In the fourth portion 25, a through hole 23 and a protruding portion 22 are formed side by side in the circumferential direction between adjacent mounting holes 21 in the circumferential direction. A plurality of (in the present embodiment, six) through holes 23, penetrating in the thickness direction (Z axis direction), are formed at equal intervals in the circumferential direction. Each through hole 23 has a shape corresponding to the protruding portion 13. A plurality of (in the present embodiment, six) protruding portions 22 protruding in the thickness direction (Z axis direction) from the surface 25A of the fourth portion 25, are formed at equal intervals in the circumferential direction. Each protruding portion 22 has a shape corresponding to the through hole 12.

Referring to FIG. 2, the inner ring 1B includes an annular first inner ring 30 and an annular second inner ring 40. In the present embodiment, the first inner ring 30 and the second inner ring 40 have the same shape. Referring to FIGS. 4 and 5, the first inner ring 30 includes a seventh portion 35, an eighth portion 36, and a ninth portion 37. In the present embodiment, the seventh portion 35, the eighth portion 36, and the ninth portion 37 have the same thickness $T_5$. In the present embodiment, the thickness $T_5$ coincides with the thickness $T_1$. The seventh portion 35 has a disk annular shape. The seventh portion 35 has a common central axis with the central axis R of the rolling bearing 1. The eighth portion 36 has a tubular shape. The external shape of the eighth portion 36 is a truncated cone shape. The eighth portion 36 extends from an outer edge of the seventh portion 35 such that its outer diameter increases with increasing distance from the seventh portion 35 in the Z axis direction. The eighth portion 36 has an annular outer circumferential surface 36A. The outer circumferential surface 36A has a common central axis with the central axis R of the rolling bearing 1. The ninth portion 37 has a cylindrical shape. The ninth portion 37 has a common central axis with the central axis R of the rolling bearing 1. The ninth portion 37 is connected to an end of the eighth portion 36 opposite to the seventh portion 35 in the Z axis direction and extends along the Z axis direction.

The outer circumferential surface 36A includes an annular seventh surface 361, an annular eighth surface 362, and an annular ninth surface 363 as a fourth region. The seventh surface 361, the eighth surface 362, and the ninth surface 363 have a common central axis with the central axis R of the rolling bearing 1. The seventh surface 361 connects a surface 35A of the seventh portion 35 on the side in contact with a tenth portion 45 to the eighth surface 362. In the cross section including the central axis R, the seventh surface 361 has a curved shape. In the cross section including the central axis R, the eighth surface 362 has a flat shape. The eighth surface 362 opposes the fifth surface 262. In the present embodiment, in the cross section including the central axis R, the eighth surface 362 and the fifth surface 262 are arranged in parallel. The ninth surface 363 connects the eighth surface 362 to an outer circumferential surface 37A of the ninth portion 37. In the cross section including the central axis R, the ninth surface 363 has a curved shape. In the present embodiment, the ninth portion 37 has a length $T_6$ in the Z axis direction in the cross section including the central axis R that is greater than 1.5 times the thickness 15 of the ninth portion 37. The length $T_6$ in the Z axis direction of the ninth portion 37 is preferably not more than five times the thickness $T_5$ of the ninth portion 37. The thickness $T_5$ of the ninth portion 37 in the present embodiment is, for example, about 1 mm. In the present embodiment, a distance $S_1$ in the radial direction between the third portion 17 and the ninth portion 37 in the cross section including the central axis R is smaller than the thickness $T_1$ of the third portion 17 and the thickness $T_5$ of the ninth portion 37.

Referring to FIGS. 2 and 4, the seventh portion 35 has a plurality of (in the present embodiment, six) mounting holes 31, penetrating in the thickness direction (Z axis direction), formed at equal intervals in the circumferential direction. In the seventh portion 35, a protruding portion 33 and a through hole 32 are formed side by side in the circumferential direction between adjacent mounting holes 31 in the circumferential direction, A plurality of (in the present embodiment, six) protruding portions 33, protruding in the thickness direction (Z axis direction) from the surface 35A of the seventh portion 35, are formed at equal intervals in the circumferential direction. A plurality of (in the present embodiment, six) through holes 32, penetrating in the thickness direction (Z axis direction), are formed at equal intervals in the circumferential direction.

Referring to FIGS. 4 and 5, the second inner ring 40 is arranged alongside the first inner ring 30 in the Z axis direction and is fixed to the first inner ring 30. The second inner ring 40 includes a tenth portion 45, an eleventh portion 46, and a twelfth portion 47. In the present embodiment, the tenth portion 45, the eleventh portion 46, and the twelfth portion 47 have the same thickness $T_7$. In the present embodiment, the thickness $T_7$ coincides with the thickness $T_1$. The tenth portion 45 has a disk annular shape. The surface 35A of the seventh portion is in contact with one surface 45A of the tenth portion 45. The tenth portion 45 has a common central axis with the central axis R of the rolling bearing 1. The eleventh portion 46 has a tubular shape. The external shape of the eleventh portion 46 is a truncated cone shape. The eleventh portion 46 extends from an outer edge of the tenth portion 45 such that its outer diameter increases with increasing distance from the tenth portion 45 in the Z axis direction. The eleventh portion 46 extends to the opposite side of the eighth portion 36 in the Z axis direction. The eleventh portion 46 has an annular outer circumferential surface 46A. The outer circumferential surface 46A has a common central axis with the central axis P. of the rolling bearing 1. The twelfth portion 47 has a cylindrical shape. The twelfth portion 47 has a common central axis with the central axis R of the rolling bearing 1. The twelfth portion 47 is connected to an end of the eleventh portion 46 opposite to the tenth portion 45 in the Z axis direction and extends along the Z axis direction to the opposite side of the ninth portion 37.

The outer circumferential surface 46A includes an annular tenth surface 461, an annular eleventh surface 462, and an annular twelfth surface 463. The tenth surface 461, the eleventh surface 462, and the twelfth surface 463 have a common central axis with the central axis R of the rolling bearing 1. The tenth surface 461 connects the surface 45A of the tenth portion 45 on the side in contact with the seventh portion 35 to the eleventh surface 462. In a cross section including the central axis R, the tenth surface 461 has a curved shape. In the cross section including the central axis R, the eleventh surface 462 has a flat shape. The eleventh surface 462 opposes the second surface 162, In the present embodiment, in the cross section including the central axis R, the eleventh surface 462 and the second surface 162 are arranged in parallel. In the cross section including the central axis R, a line segment $V_1$ connecting the second surface 162 and the eleventh surface 462 intersects (is orthogonal to) a line segment $V_2$ connecting the fifth surface 262 and the eighth surface 362. The twelfth surface 463 connects the eleventh surface 462 to an outer circumferential surface 47A of the twelfth portion 47. In the cross section including the central axis R, the twelfth surface 463 has a curved shape. In the present embodiment, in the cross section including the central axis R, the twelfth portion 47 has a length 18 in the Z axis direction that is greater than 1.5 times the thickness 17 of the twelfth portion 47, The length $T_8$ in the Z axis direction of the twelfth portion 47 is preferably not more than five times the thickness $T_7$ of the twelfth portion 47. The thickness $T_1$ of the twelfth portion 47 in the present embodiment is, for example, about 1 mm. In the present embodiment, a distance $S_2$ in the radial direction between the sixth portion 27 and the twelfth portion 47 in the cross section including the central axis R is smaller than the thickness $T_3$ of the sixth portion 27 and the thickness 17 of the twelfth portion 47.

Referring to FIGS. 3 and 4, the tenth portion 45 has a plurality of mounting holes 41, penetrating in the thickness direction (Z axis direction), formed at equal intervals in the circumferential direction. In the tenth portion 45, a through hole 43 and a protruding portion 42 are formed side by side in the circumferential direction between adjacent mounting holes 41 in the circumferential direction. A plurality of (in the present embodiment, six) through holes 43, penetrating in the thickness direction (Z axis direction), are formed at equal intervals in the circumferential direction. Each through hole 43 has a shape corresponding to the protruding portion 33. A plurality of (in the present embodiment, six) protruding portions 42, protruding in the thickness direction (Z axis direction) from the surface 45A of the tenth portion 45, are formed at equal intervals in the circumferential direction. Each protruding portion 42 has a shape corresponding to the through holes 32.

Figure 6:
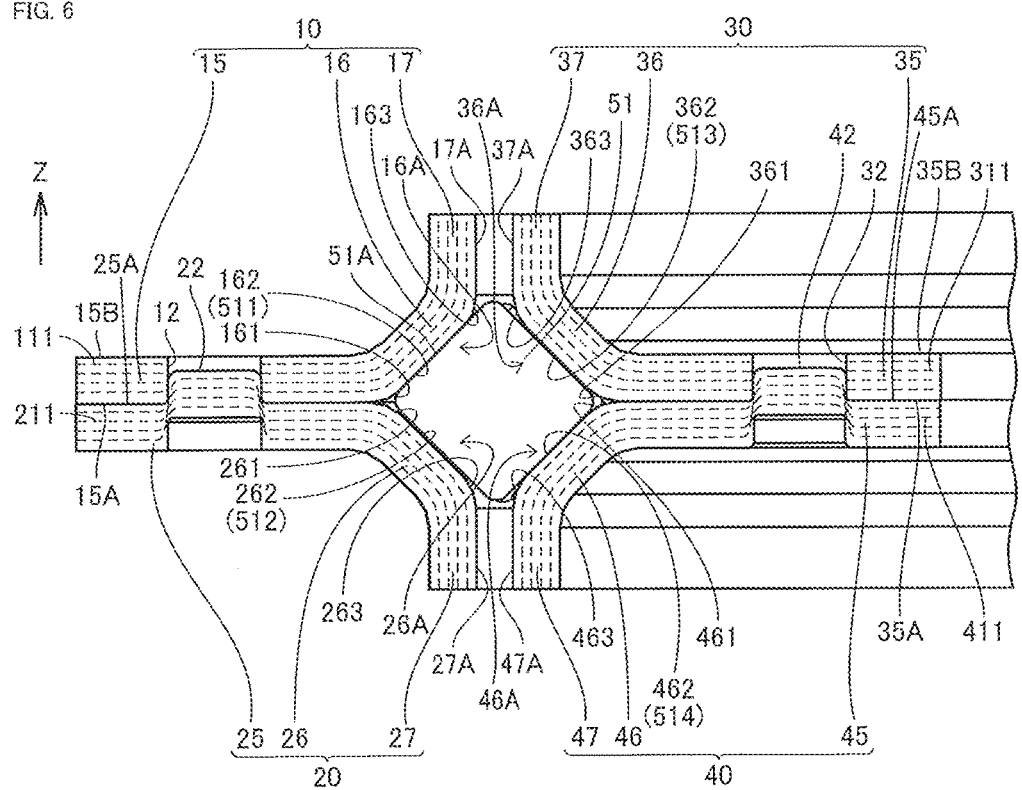
FIG. 6 is a schematic diagram illustrating the state of grain flows in the outer and inner rings.

FIG. 6 is a diagram illustrating grain flows in a cross section of the rolling hearing 1 when cut at A-A in FIG. 1, Referring to FIG. 6, in the first outer ring 10, grain flows 111 in the steel that constitutes the first outer ring 10 extend along the surface 15A of the first portion 15, the inner circumferential surface 16A of the second portion 16, and the inner circumferential surface 17A of the third portion 17. The grain flows ill extend along the first surface 161, the second surface 162, and the third surface 163 of the inner circumferential surface 16A. In the present embodiment, the grain flows 111 extend parallel to the second surface 162. In the second outer ring 20, grain flows 211 in the steel that constitutes the second outer ring 20 extend along the surface 25A of the fourth portion 25, the inner circumferential surface 26A of the fifth portion 26, and the inner circumferential surface 27A of the sixth portion 27. The grain flows 211 extend along the fourth surface 261, the fifth surface 262, and the sixth surface 263 of the inner circumferential surface 26A. In the present embodiment, the grain flows 211 extend parallel to the fifth surface 262. In the first inner ring 30, grain flows 311 in the steel that constitutes the first inner ring 30 extend along the surface 35A of the seventh portion 35, the outer circumferential surface 36A of the eighth portion 36, and the outer circumferential surface 37A of the ninth portion 37. The grain flows 311 extend along the seventh surface 361, the eighth surface 362, and the ninth surface 363 of the outer circumferential surface 36A. In the present embodiment, the grain flows 311 extend parallel to the eighth surface 362. In the second inner ring 40, grain flows 411 in the steel that constitutes the second inner ring 40 extend along the surface 45A of the tenth portion 45, the outer circumferential surface 46A of the eleventh portion 46, and the outer circumferential surface 47A of the twelfth portion 47. The grain flows 411 extend along the tenth surface 461, the eleventh surface 462, and the twelfth surface 463 of the outer circumferential surface 46A. In the present embodiment, the grain flows 411 extend parallel to the eleventh surface 462.

Referring to FIG. 3, the plurality of rollers 1C include a plurality of first rollers 51 and a plurality of second rollers 52. In the present embodiment, the first rollers 51 and the second rollers 52 are made of steel. In the present embodiment, the first rollers 51 and the second rollers 52 are made of, for example, SUE specified in JIS standard. In the present embodiment, the rollers 1C include 27 first rollers 51 and 27 second rollers 52. The first rollers 51 and the second rollers 52 have a cylindrical shape. The first rollers 51 and the second rollers 52 are arranged alternately in the circumferential direction. Referring to FIG. 5, the first rollers 51 are disposed such that they can roll while contacting the second surface 162 and the eleventh surface 462 at their outer circumferential surfaces 51A. The second surface 162 constitutes a first rolling surface 511. The eleventh surface 462 constitutes a fourth rolling surface 514. The first rolling surface 511 and the fourth rolling surface 514 have a common central axis with the central axis R of the rolling bearing 1. Each first roller 51 has one end face 51B in the axial direction that is opposite to the eighth surface 362. The other end face 51C in the axial direction of the first roller 51 is in contact with the fifth surface 262. In the present embodiment, an annular space $M_1$ is formed which is enclosed by the first surface 161, the fourth surface 261, and the first roller 51.

Figure 7:
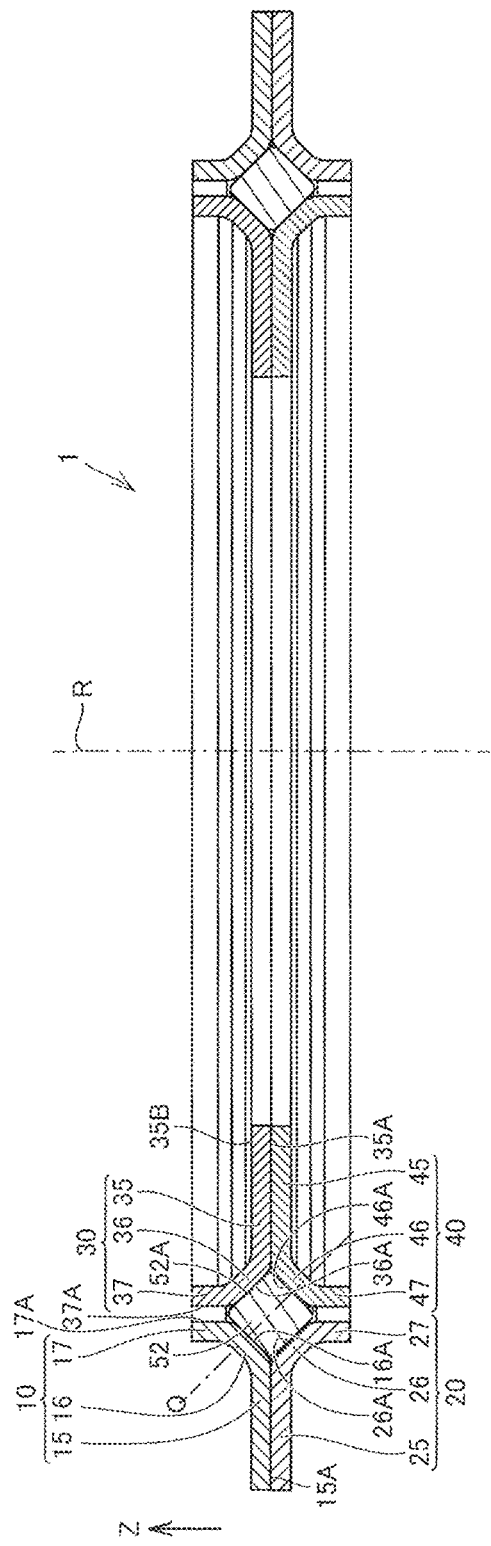
FIG. 7 is a schematic cross-sectional view showing the structure of the rolling bearing in Embodiment 1.
Figure 8:
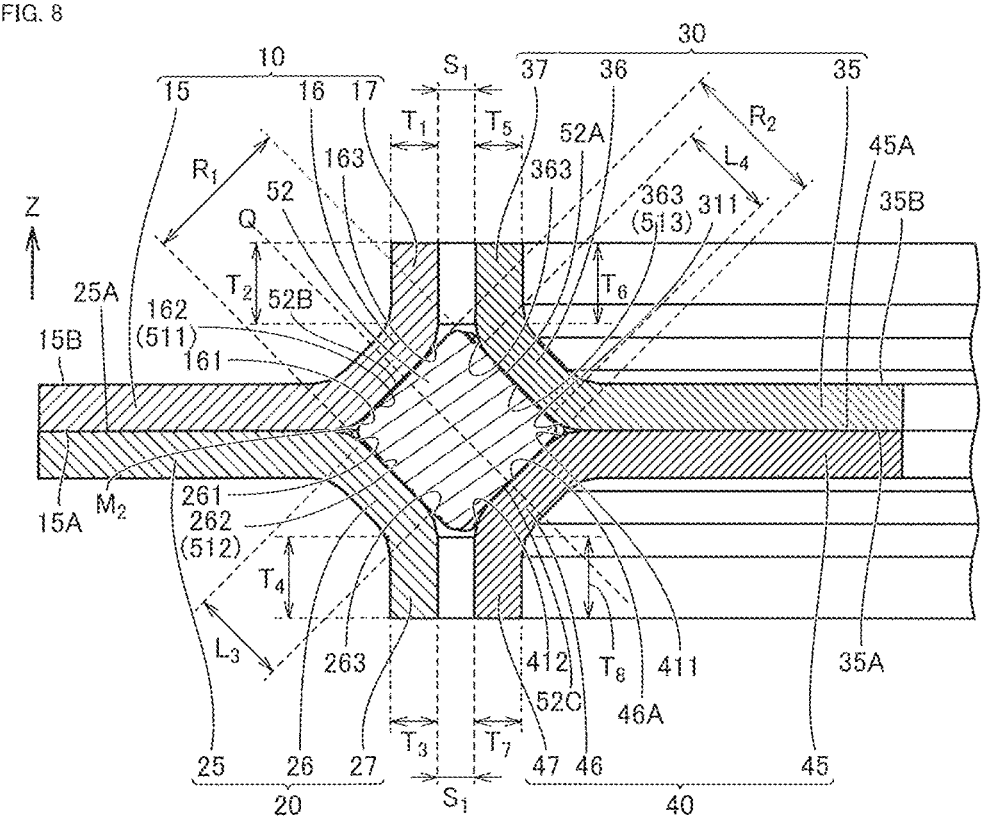
FIG. 8 is a schematic cross-sectional view showing the structure of the rolling bearing in Embodiment 1.

FIG. 7 is a cross-sectional view of the rolling bearing 1 when cut at B-B in FIG. 1. FIG. 7 is a cross section including the central axis of a second roller 52, which will be described below. FIG. 8 is a cross-sectional diagram showing, in an enlarged view, the area around the second roller in FIG. 7. Referring to FIGS. 7 and 8, the second rollers 52 are disposed such that they can roll while contacting the fifth surface 262 and the eighth surface 362 at their outer circumferential surfaces 52A. The fifth surface 262 constitutes a second rolling surface 512. The eighth surface 362 constitutes a third rolling surface 513. The second rolling surface 512 and the third rolling surface 513 have a common central axis with the central axis R of the rolling bearing 1. Each second roller 52 has one end face 52B in the axial direction that is in contact with the second surface 162. The other end face 52C in the axial direction of the second roller 52 is opposite to the eleventh surface 462. In the present embodiment, an annular space $M_2$ is formed which is enclosed by the first surface 161, the fourth surface 261, and the second roller 52 (see FIG. 5), Referring to FIGS. 4 and 7, the first roller 51 has a central axis P that intersects (is orthogonal to) a central axis Q of the second roller 52. Here, the state in which the central axis P of the first roller 51 intersects the central axis Q of the second roller 52 means that when the center of gravity of the first roller 51 and the second roller 52 passes through a predetermined point during rotation of the rolling bearing 1, the central axis P of the first roller 51 and the central axis Q of the second roller 52 intersect with (are orthogonal to) each other.

Referring to FIGS. 5 and 8, in the present embodiment, in the cross section including the central axis R, the thickness $T_1$ of the first portion 15, the second portion 16, and the third portion 17 is less than 0.5 times a diameter $U_1$ of the first roller 51 and a diameter $R_1$ of the second roller. The thickness $T_3$ of the fourth portion 25, the fifth portion 26, and the sixth portion 27 is less than 0.5 times the diameter $U_1$ of the first roller 51 and the diameter $R_1$ of the second roller. The thickness $T_5$ of the seventh portion 35, the eighth portion 36, and the ninth portion 37 is less than 0.5 times the diameter $U_1$ of the first roller 51 and the diameter $R_1$ of the second roller. The thickness $T_7$ of the tenth portion 45, the eleventh portion 46, and the twelfth portion 47 is less than 0.5 times the diameter $U_1$ of the first roller 51 and the diameter $R_1$ of the second roller. In the cross section including the central axis R, an effective contact length $L_1$ between the outer circumferential surface 51A of the first roller 51 and the second surface 162 and an effective contact length $L_2$ between the outer circumferential surface 51A and the eleventh surface 462 are not less than 0.5 times and not more than 0.9 times a length $U_2$ in the axial direction of the first roller 51. In the cross section including the central axis R, an effective contact length $L_3$ between the outer circumferential surface 52A of the second roller 52 and the fifth surface 262 and an effective contact length $L_4$ between the outer circumferential surface 52A and the eighth surface 362 are not less than 0.5 times and not more than 0.9 times a length $R_2$ in the axial direction of the second roller 52.

A description will now be made of a method for producing the rolling bearing 1 in the present embodiment. First, a first steel plate, a second steel plate, a third steel plate, and a fourth steel plate having a flat plate shape are prepared. Next, the first steel plate, the second steel plate, the third steel plate, and the fourth steel plate are each subjected to press working.

In this manner, the first outer ring 10, the second outer ring 20, the first inner ring 30, and the second inner ring 40 having the shapes shown in FIGS. 2 and 3 are formed. Next, referring to FIG. 4, the inner circumferential surface 16A of the second portion 16, the inner circumferential surface 26A of the fifth portion 26, the inner circumferential surface 36A of the eight portion 36, and the inner circumferential surface 46A of the eleventh portion 46 are subjected to known heat treatment. More specifically, carburizing or carbonitriding treatment, and quenching and tempering and the like are performed. Performing such treatment can improve the hardness of the inner circumferential surfaces 16A, 26A, 36A, and 46A. In the present embodiment, no grinding work is performed on the inner circumferential surfaces 16A, 26A, 36A, and 46A. Next, the second inner ring 40 is attached to the first inner ring 30 to form the inner ring 1B. More specifically, the protruding portions 33 are fitted into the through holes 43 and the protruding portions 42 are fitted into the through holes 32. The inner ring 1B thus formed and the second outer ring 20 are attached to a jig. At this time, they are attached such that the outer circumferential surface 47A of the twelfth portion 47 and the inner circumferential surface 27A of the sixth portion 27 oppose each other (see FIG. 5). Next, the first rollers 51 and the second rollers 52 are arranged alternately in the space enclosed by the inner ring 1B and the second outer ring 20. Next, the first outer ring 10 is attached to the second outer ring 20 to form the outer ring 1A. More specifically, the protruding portions 13 are fitted into the through holes 23 and the protruding portions 22 are fitted into the through holes 12.

Figure 9:
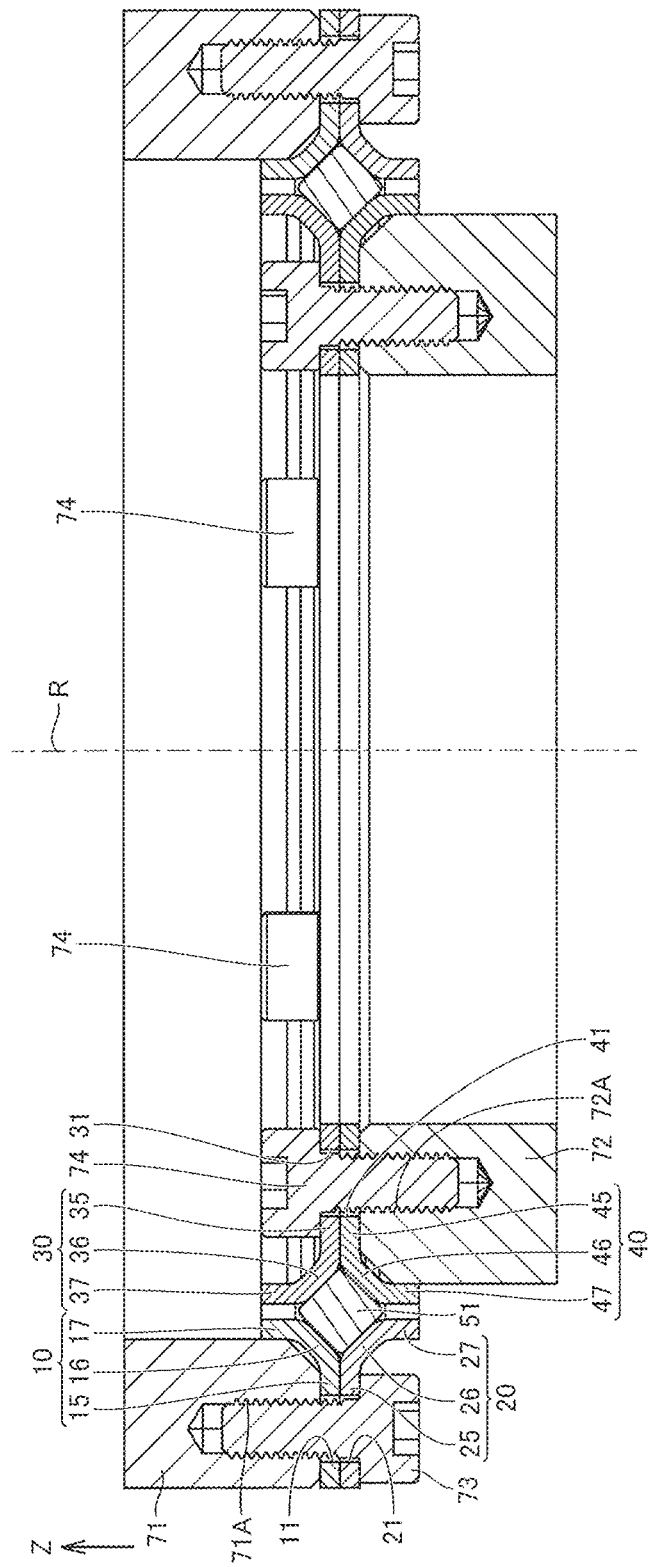
FIG. 9 is a schematic cross-sectional view showing the use state of the rolling bearing in Embodiment 1.

A description will now be made of an exemplary way of using the rolling bearing 1 in the present embodiment. Referring to FIG. 9, the first outer ring 10 and the second outer ring 20 are fixed to an annular first member 71. The first member 71 has a plurality of screw holes 71A, each surrounded by a wall surface with helical screw grooves, formed at equal intervals in the circumferential direction. The screw holes 71A have a shape corresponding to the mounting holes 11 and 21. They are arranged such that the positions where the screw holes 71A are formed coincide with the positions where the mounting holes 11, 21 are formed, and fixing bolts 73 are screwed into the holes. The first inner ring 30 and the second inner ring 40 are fixed to an annular second member 72. The second member 72 has a plurality of screw holes 72A, each surrounded by a wall surface with helical screw grooves, formed at equal intervals in the circumferential direction. The screw holes 72A have a shape corresponding to the mounting holes 31 and 41. They are arranged such that the positions where the screw holes 72A are formed coincide with the positions where the mounting holes 31, 41 are formed, and fixing bolts 74 are screwed into the holes. With the rolling bearing 1 installed in this manner, the second member 72 is supported with respect to the first member 71 so as to be rotatable in the circumferential direction.

Here, in the rolling bearing 1 in the present embodiment, in a cross section including the central axis R, the grain flows of the steels constituting the first outer ring 10, the second outer ring 20, the first inner ring 30, and the second inner ring 40 extend along the first rolling surface 511, the second rolling surface 512, the third rolling surface 513, and the fourth rolling surface 514, respectively. That is, the grain flows on the first rolling surface 511, the second rolling surface 512, the third rolling surface 513, and the fourth rolling surface 514 are each formed continuously without any breaks. This can suppress the contact of the first rollers 51 and the second rollers 52 with the ends of the steel grain flows. Accordingly, the durability of the inner ring 1B and the outer ring 1A can be improved. As such, the rolling bearing 1 in the present embodiment has improved durability.

In the above embodiment, the steel grain flows 111, 211, 311, and 411 are formed continuously along the third surface 163, the sixth surface 263, the ninth surface 363, and the twelfth surface 463. Adopting such a configuration can suppress the reduction in rigidity of the first outer ring 10, the second outer ring 20, the first inner ring 30, and the second inner ring 40 when mounting the first outer ring 10, the second outer ring 20, the first inner ring 30, and the second inner ring 40 to another member. Further, the steel grain flows 111, 211, 311, and 411 are formed continuously along the first surface 161, the fourth surface 261, the seventh surface 361, and the tenth surface 461. Adopting such a configuration can improve the bending strength of the first outer ring 10, the second outer ring 20, the first inner ring 30, and the second inner ring 40 when the first rolling surface 511, the second rolling surface 512, the third rolling surface 513, and the fourth rolling surface 514 receive loads from the first rollers 51 and the second rollers 52.

In the above embodiment, the first outer ring 10 includes the first portion 15, the second portion 16, and the third portion 17. The second outer ring 20 includes the fourth portion 25, the fifth portion 26, and the sixth portion 27. The first inner ring 30 includes the seventh portion 35, the eighth portion 36, and the ninth portion 37. The second inner ring 40 includes the tenth portion 45, the eleventh portion 46, and the twelfth portion 47. The inner circumferential surface 16A of the second portion 16 includes the first rolling surface 511. The inner circumferential surface 26A of the fifth portion 26 includes the second rolling surface 512. The inner circumferential surface 36A of the eighth portion 36 includes the third rolling surface 513. The inner circumference surface 46A of the eleventh portion 46 includes the fourth rolling surface 514. The first outer ring 10 and the second outer ring 20 of the above configurations can readily be formed, for example, by performing press forming. Accordingly, the production cost of the rolling bearing 1 can be reduced.

In the above embodiment, the annular space $M_1$ enclosed by the first surface 161, the fourth surface 261, and the first roller 51 and the annular space $M_2$ enclosed by the first surface 161, the fourth surface 261, and the second roller 52 are formed. The annular spaces $M_1$ and $M_2$ as described above can hold a lubricant. This can reduce the risk of occurrence of oil film shortage between the first roller 51 and the first rolling surface 511 and between the second roller 52 and the second rolling surface 512.

In the above embodiment, in a cross section including the central axis R, the thickness $T_1$ of the first portion 15, the second portion 16, and the third portion 17 is less than 0.5 times the diameter $U_1$ of the first roller 51 and the diameter $R_1$ of the second roller. The thickness $T_3$ of the fourth portion 25, the fifth portion 26, and the sixth portion 27 is less than 0.5 times the diameter U of the first roller 51 and the diameter $R_1$ of the second roller. The thickness $T_5$ of the seventh portion 35, the eighth portion 36, and the ninth portion 37 is less than 0.5 times the diameter $U_1$ of the first roller 51 and the diameter $R_1$ of the second roller. The thickness $T_7$ of the tenth portion 45, the eleventh portion 46, and the twelfth portion 47 is less than 0.5 times the diameter $U_1$ of the first roller 51 and the diameter $R_1$ of the second roller. Adopting such a configuration can reduce the weight of the first outer ring 10, the second outer ring 20, the first inner ring 30, and the second inner ring 40.

In the above embodiment, in a cross section including the central axis R, the distance $S_1$ in the radial direction between the third portion 17 and the ninth portion 37 is smaller than the thickness $T_1$ of the third portion 17 and the thickness $T_5$ of the ninth portion 37. The distance 52 in the radial direction between the sixth portion 27 and the twelfth portion 47 in the cross section including the central axis R is smaller than the thickness $T_3$ of the sixth portion 27 and the thickness $T_7$ of the twelfth portion 47. Setting the distances $S_1$ and $S_2$ in the above ranges can reduce the entry of foreign matter into the space enclosed by the first outer ring 10, the second outer ring 20, the first inner ring 30, and the second inner ring 40 from the gap formed between the third portion 17 and the ninth portion 37 and the gap formed between the sixth portion 27 and the twelfth portion 47.

In the above embodiment, in a cross section including the central axis R, the length $T_2$ of the third portion 17 in the Z axis direction is greater than 1.5 times the thickness $T_1$ of the third portion 17. The length $T_4$ of the sixth portion 27 in the Z axis direction is greater than 1.5 times the thickness $T_3$ of the sixth portion 27. The length $T_6$ of the ninth portion 37 in the 7 axis direction is greater than 1.5 times the thickness $T_5$ of the ninth portion 37, The length $T_5$ of the twelfth portion 47 in the Z axis direction is greater than 1.5 times the thickness $T_7$ of the twelfth portion. By adopting such a configuration, when mounting and fixing the first outer ring 10, the second outer ring 20, the first inner ring 30, and the second inner ring 40 to another member, an outer circumferential surface 17B of the third portion 17, an outer circumferential surface 27B of the sixth portion 27, an inner circumferential surface 37B of the ninth portion 37, and an inner circumferential surface 47B of the twelfth portion 47 serve as reference surfaces to facilitate the mounting.

In the above embodiment, in a cross section including the central axis R, the third surface 163 and the sixth surface 263 are curved and have a pseudo-crowning shape. By adopting such a configuration, the concentration of stress caused by the contact between the third surface 163 and the first roller 51 (contact stress at the raceway end portion), so-called edge load, can be reduced. Similarly, the concentration of stress caused by the contact between the sixth surface 263 and the second roller 52 (contact stress at the raceway end portion), so-called edge load, can be reduced. This results in a prolonged life of the rolling bearing 1.

In the above embodiment, in a cross section including the central axis R, the effective contact length $L_1$ between the outer circumferential surface 52B of the first roller 51 and the second surface 162 and the effective contact length $L_2$ between the outer circumferential surface 51B of the first roller 51 and the eleventh surface 462 are not less than 0.5 times and not more than 0.9 times the length $U_2$ in the axial direction of the first roller 51. The effective contact length $L_3$ between the outer circumferential surface 52B of the second roller 52 and the fifth surface 262 and the effective contact length $L_4$ between the outer circumferential surface 52B of the second roller 52 and the eighth surface 362 are not less than 0.5 times and not more than 0.9 times the length $R_2$ in the axial direction of the second roller 52. With the effective contact lengths $L_1$ and $L_2$ in the above range, the frictional force between the first roller 51 and the first and fourth rolling surfaces 511 and 514 can be reduced. With the effective contact lengths $L_3$ and $L_4$ in the above range, the frictional force between the second roller 52 and the second and third rolling surfaces 512 and 513 can be reduced. Therefore, the increase in rotational torque due to the first and second rollers 51 and 52 can be suppressed.

In the above embodiment, the case of adopting the first and second rollers 51 and 52 made of steel as the rolling elements has been described. However, not limited to this case, first and second rollers 51 and 52 made of ceramic (for example, alumina or silicon nitride) or made of resin may be adopted. Adopting such rollers as described above can achieve weight reduction of the rolling bearing 1. Further, in the above embodiment, the case where the outer ring 1A is fixed and the inner ring 1B is rotated has been described. However, not limited to this case, a configuration in which the inner ring 1B is fixed and the outer ring 1A is rotated may also be adopted.

(Variation 1)

Figure 10:
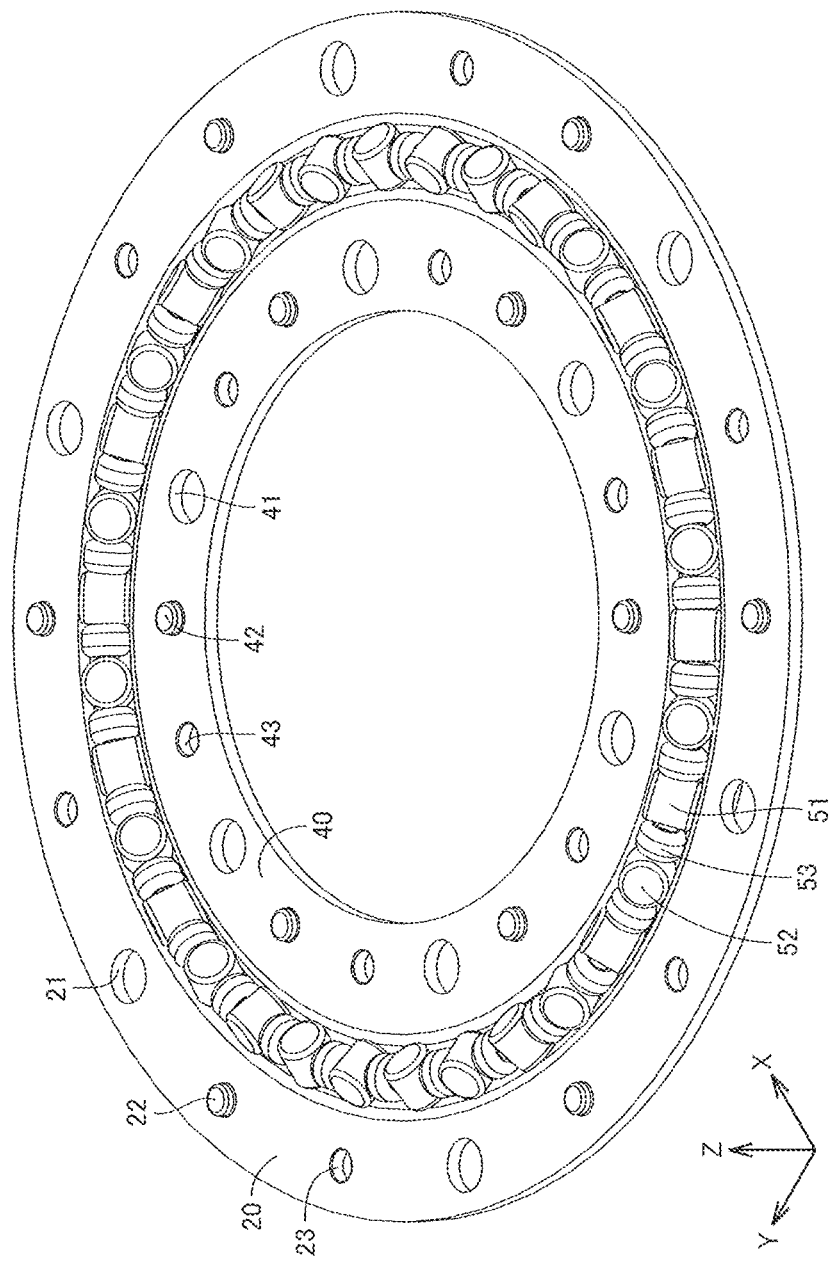
FIG. 10 is a schematic perspective view showing a first variation of the rolling hearing in Embodiment 1.

A description will now be made of a first variation of the rolling bearing 1 in Embodiment 1. FIG. 10 is a perspective view corresponding to the state in which the first outer ring 10 and the first inner ring 30 of the rolling bearing 1 in FIG. 2 have been removed. Referring to FIG. 10, in the present variation, in addition to the structure in Embodiment 1 above, a separator 53 is arranged between a first roller 51 and a second roller 52 in the circumferential direction. The separators 53 thus arranged can keep the first and second rollers 51 and 52 at predetermined intervals.

(Variation 2)

Figure 11:
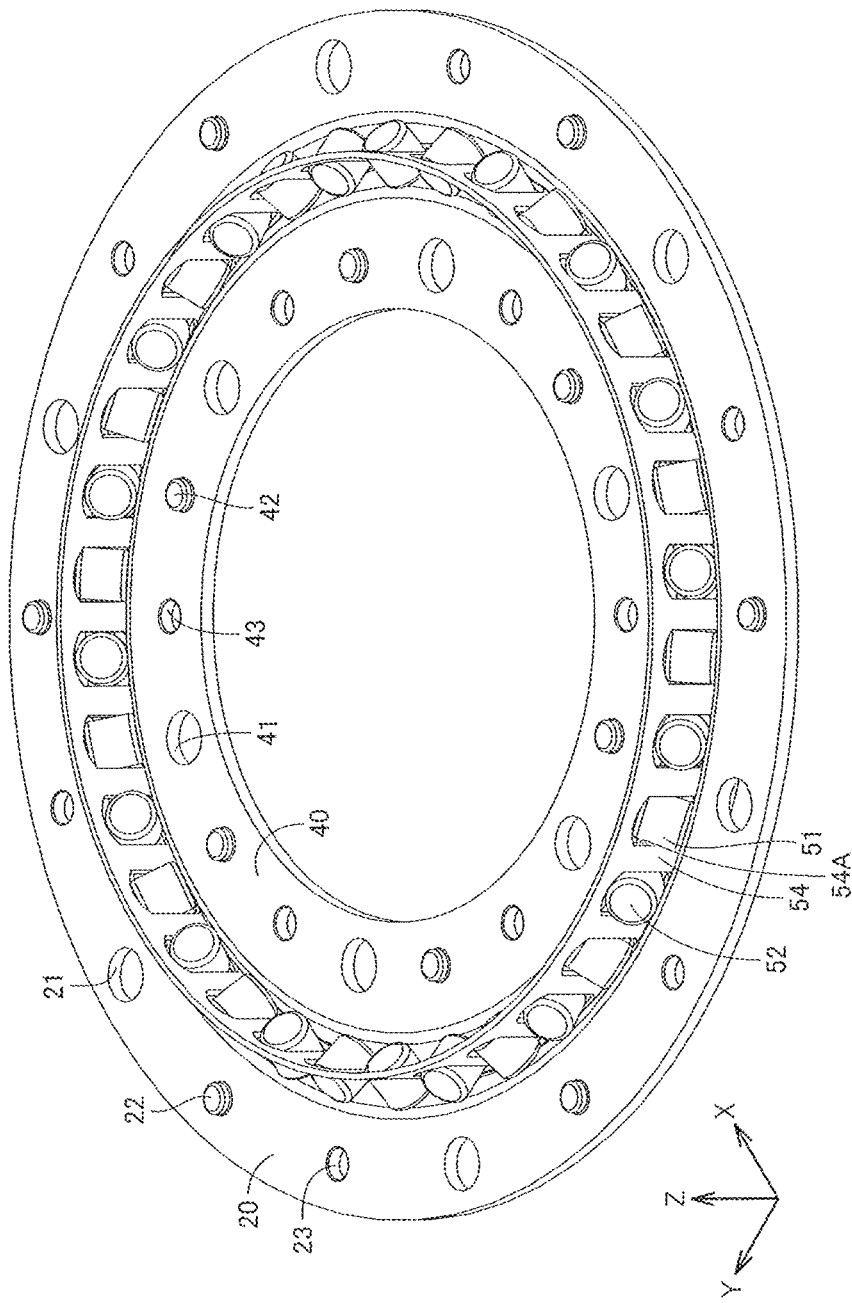
FIG. 11 is a schematic perspective view showing a second variation of the rolling bearing in Embodiment 1.

FIG. 11 is a perspective view corresponding to the state in Which the first outer ring 10 and the first inner ring 30 of the rolling bearing 1 in FIG. 2 have been removed. Referring to FIG. 11, in the present variation, in addition to the structure in Embodiment 1 above, a retainer 54 is arranged to hold the plurality of first rollers 51 and the plurality of second rollers 52 at predetermined intervals. The retainer 54 in the present variation has an annular shape. The retainer 54 has a plurality of through holes 54A, each having a shape corresponding to the first and second rollers 51 and 52, formed at equal intervals in the circumferential direction. The first rollers 51 and the second rollers 52 are each retained in the corresponding through hole 54A.

Embodiment 2

A description will now be made of Embodiment 2 of the rolling bearing 1 of the present disclosure. The rolling bearing 1 in Embodiment 2 basically has a similar structure and produces similar effects as the rolling bearing 1 in Embodiment 1. However, Embodiment 2 differs from Embodiment 1 in that the first outer ring 10 and the second outer ring 20 include a labyrinth portion. The points that are different from the case of Embodiment 1 will mainly be described below.

Figure 12:
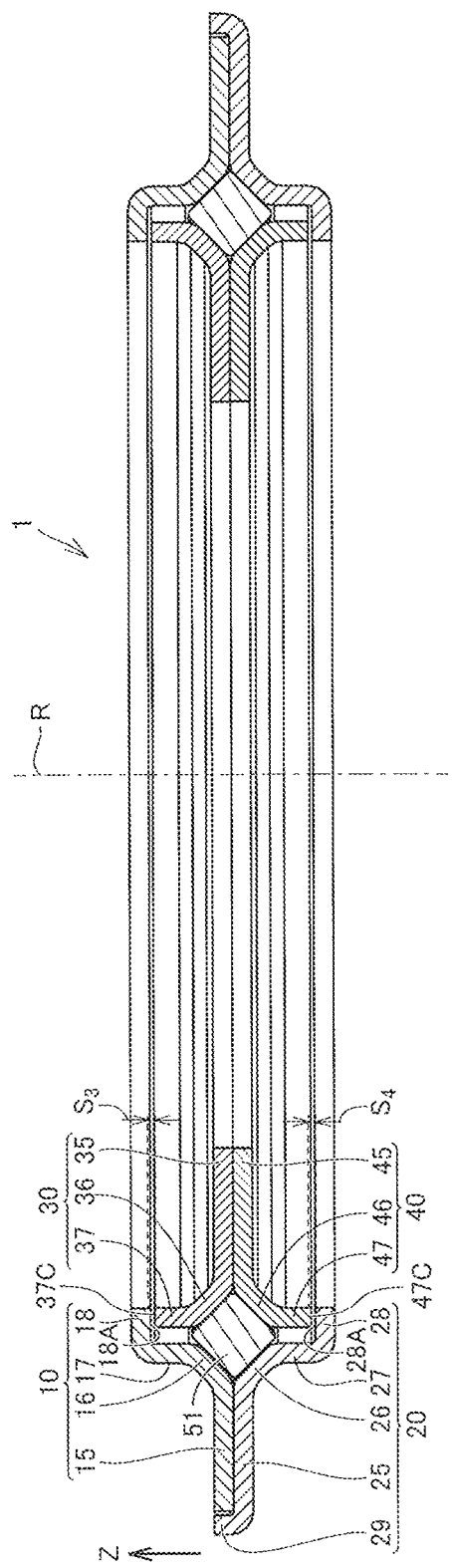
FIG. 12 is a schematic cross-sectional view showing the structure of a rolling bearing in Embodiment 2.

Referring to FIG. 12, the first outer ring 10 in the present embodiment further includes a first labyrinth portion 18. The first labyrinth portion 18 is arranged to be connected to an end of the third portion 17 opposite to the second portion 16 in the Z axis direction and to be bent radially inward of the third portion 17. The first labyrinth portion 18 has a disk shape. The first labyrinth portion 18 has one surface 18A in the Z axis direction arranged to oppose, with a small interval, an end face 37C of the ninth portion 37 opposite to the eighth portion 36 in the Z axis direction. A distance $S_3$ in the Z axis direction between the first labyrinth portion 18 and the ninth portion 37 in the cross section including the central axis R is smaller than the distance St in the radial direction between the third portion 17 and the ninth portion 37 (see FIG. 5). In the present embodiment, the distance $S_3$ is, for example, about 0.2 mm.

The second outer ring 20 further includes a second labyrinth portion 28 and a bent portion 29. The second labyrinth portion 28 is arranged to be connected to an end of the sixth portion 27 opposite to the fifth portion 26 in the Z axis direction and to be bent radially inward of the sixth portion 27. The second labyrinth portion 28 has a disk shape. The second labyrinth portion 28 has one surface 28A in the Z axis direction arranged to oppose, with a small interval, an end face 47B of the twelfth portion 47 opposite to the eleventh portion 46 in the Z axis direction. A distance $S_4$ in the Z axis direction between the second labyrinth portion 28 and the twelfth portion 47 in the cross section including the central axis R is smaller than the distance $S_2$ in the radial direction between the sixth portion 27 and the twelfth portion 47 (see FIG. 5). In the present embodiment, the distance $S_4$ is, for example, about 0.2 mm.

The second outer ring 20 includes the bent portion 29. The bent portion 29 has an annular shape. The bent portion 29 is a region where the outer circumferential portion of the fourth portion 25 is bent along the Z axis direction to the opposite side of the fifth portion 26. Adopting such a configuration facilitates assembly of the rolling bearing 1.

The rolling bearing 1 of Embodiment 2 above can also be improved in durability, similarly as in Embodiment 1.

In the above embodiment, the first outer ring 10 includes the first labyrinth portion 18. The second outer ring 20 includes the second labyrinth portion 28. The first labyrinth portion 18 and the second labyrinth portion 28 thus included can further reduce the entry of foreign matter into the space enclosed by the first outer ring 10, the second outer ring 20, the first inner ring 30, and the second inner ring 40 from the gap formed between the third portion 17 and the ninth portion 37 and the gap formed between the sixth portion 27 and the twelfth portion 47.

Embodiment 3

A description will now be made of Embodiment 3 of the rolling bearing 1 of the present disclosure. The rolling bearing 1 in Embodiment 3 basically has a similar structure and produces similar effects as the rolling bearing 1 in Embodiment 2. However, Embodiment 3 differs from Embodiment 2 in that the first inner ring 30 and the second inner ring 40 include a labyrinth portion. The points that are different from the case of Embodiment 2 will mainly be described below.

Figure 13:
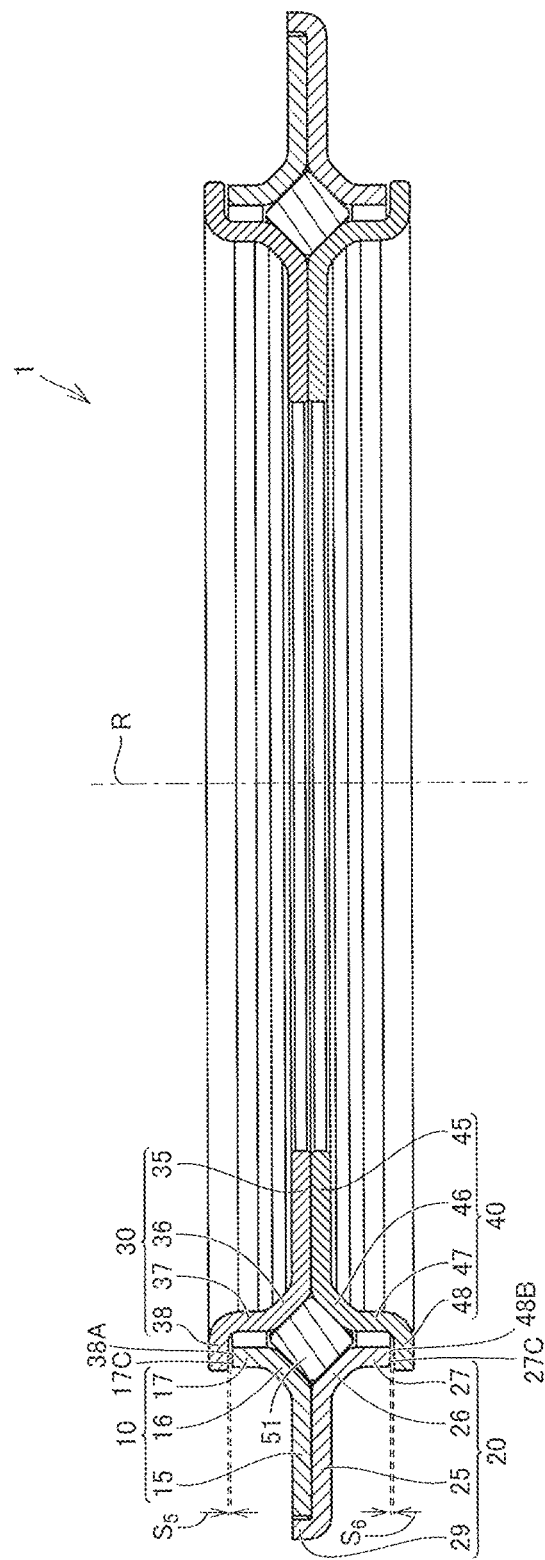
FIG. 13 is a schematic cross-sectional view showing the structure of a rolling bearing in Embodiment 3.

Referring to FIG. 13, the first inner ring 30 in the present embodiment includes a first labyrinth portion 38. The first labyrinth portion 38 is arranged to be connected to an end of the ninth portion 37 opposite to the eighth portion 36 in the Z axis direction and to be bent radially outward of the ninth portion 37. The first labyrinth portion 38 has a disk shape. The first labyrinth portion 38 has one surface 38A in the Z axis direction arranged to oppose, with a small interval, an end face 17C of the third portion 17 opposite to the second portion 16 in the Z axis direction. A distance $S_5$ in the Z axis direction between the first labyrinth portion 38 and the third portion 17 in the cross section including the central axis R is smaller than the distance $S_1$ in the radial direction between the third portion 17 and the ninth portion 37 (see FIG. 5). In the present embodiment, the distance $S_5$ is, for example, about 0.2 mm.

The second inner ring 40 includes a second labyrinth portion 28. The second labyrinth portion 28 is arranged to be connected to an end of the twelfth portion 47 opposite to the eleventh portion 46 in the Z axis direction and to be bent radially outward of the twelfth portion 47. The second labyrinth portion 28 has a disk shape. The second labyrinth portion 28 has one surface 48A in the Z axis direction arranged to oppose, with a small interval, an end face 27B of the sixth portion 27 opposite to the fifth portion 26 in the Z axis direction. A distance Sc in the Z axis direction between the second labyrinth portion 28 and the sixth portion 27 in the cross section including the central axis R is smaller than the distance $S_2$ in the radial direction between the sixth portion 27 and the twelfth portion 47 (see FIG. 5). In the present embodiment, the distance $S_6$ is, for example, about 0.2 mm.

The rolling bearing 1 of Embodiment 2 above can also be improved in durability, similarly as in Embodiment 1.

In the above embodiment, the first inner ring 30 includes the first labyrinth portion 38. The second inner ring 40 includes the second labyrinth portion 48. The first labyrinth portion 38 and the second labyrinth portion 48 thus included can further reduce the entry of foreign matter into the space enclosed by the first outer ring 10, the second outer ring 20, the first inner ring 30, and the second inner ring 40 from the gap formed between the third portion 17 and the ninth portion 37 and the gap formed between the sixth portion 27 and the twelfth portion 47.

Embodiment 4

A description will now be made of Embodiment 4 of the rolling bearing 1 of the present disclosure. The rolling bearing 1 in Embodiment 4 basically has a similar structure and produces similar effects as the rolling bearing 1 in Embodiment 1. However, Embodiment 4 differs from Embodiment 1 in that balls are adopted as the rolling elements. The points that are different from the case of Embodiment 1 will mainly be described below.

Figure 14:
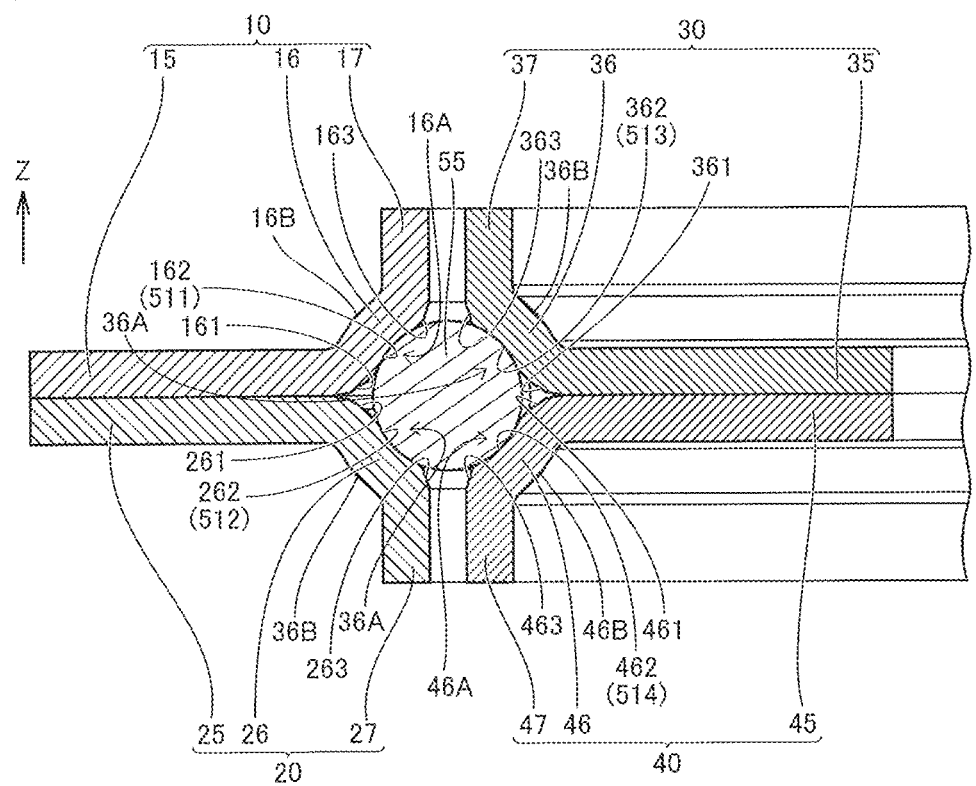
FIG. 14 is a schematic cross-sectional view showing the structure of a rolling bearing in Embodiment 4.

Referring to FIG. 14, the inner circumferential surface 16A of the second portion 16 in the first outer ring 10 includes a first surface 161, a second surface 162, and a third surface 163. In a cross section including the central axis R, the second surface 162 has an arc shape with a larger radius of curvature than the surface of a ball 55. In the cross section including the central axis R, the second portion 16 has an outer circumferential surface 16B of an arc shape. The inner circumferential surface 26A of the fifth portion 26 in the second outer ring 20 includes a fourth surface 261, a fifth surface 262, and a sixth surface 263. In the cross section including the central axis R, the fifth surface 262 has an arc shape with a larger radius of curvature than the surface of the ball 55. In the cross section including the central axis R, the fifth portion 26 has an outer circumferential surface 26B of an arc shape. The inner circumferential surface 36A of the eighth portion 36 in the first inner ring 30 includes a seventh surface 361, an eighth surface 362, and a ninth surface 363. In the cross section including the central axis R, the eighth surface 362 has an arc shape with a larger radius of curvature than the surface of the ball 55. In the cross section including the central axis R, the eighth portion 36 has an inner circumferential surface 36B of an arc shape. The inner circumferential surface 46A of the eleventh portion 46 in the second inner ring 40 includes a tenth surface 461, an eleventh surface 462, and a twelfth surface 463. In the cross section including the central axis R, the eleventh surface 462 has an arc shape with a larger radius of curvature than the surface of the ball 55. In the cross section including the central axis R, the eleventh portion 46 has an inner circumferential surface 46B of an arc shape. The balls 55 as the rolling elements are arranged so as to be capable of rolling while contacting the second surface 162, the fifth surface 262, the eighth surface 362, and the eleventh surface 462 at their outer circumferential surfaces 55A. It should be noted that the four rolling surfaces may be formed to have a gothic arch shape in the cross section including the rotational axis G. Adopting balls 55 as the rolling elements can reduce the rotational resistance of the rolling bearing 1.

In the above Embodiment 4, the rotational resistance of the rolling bearing 1 can be reduced by adopting the balls 55 as the rolling elements.

Embodiment 5

A description will now be made of Embodiment 5 of the rolling bearing 1 of the present disclosure. The rolling bearing 1 in Embodiment 5 basically has a similar structure and produces similar effects as the rolling bearing 1 in Embodiment 1. However, Embodiment 5 differs from Embodiment 1 in that the outer and inner rings do not have any portion protruding in the direction along the central axis R, and the external shape of the rolling bearing is formed flat. The points that are different from the case of Embodiment 1 will mainly be described below.

Figure 15:
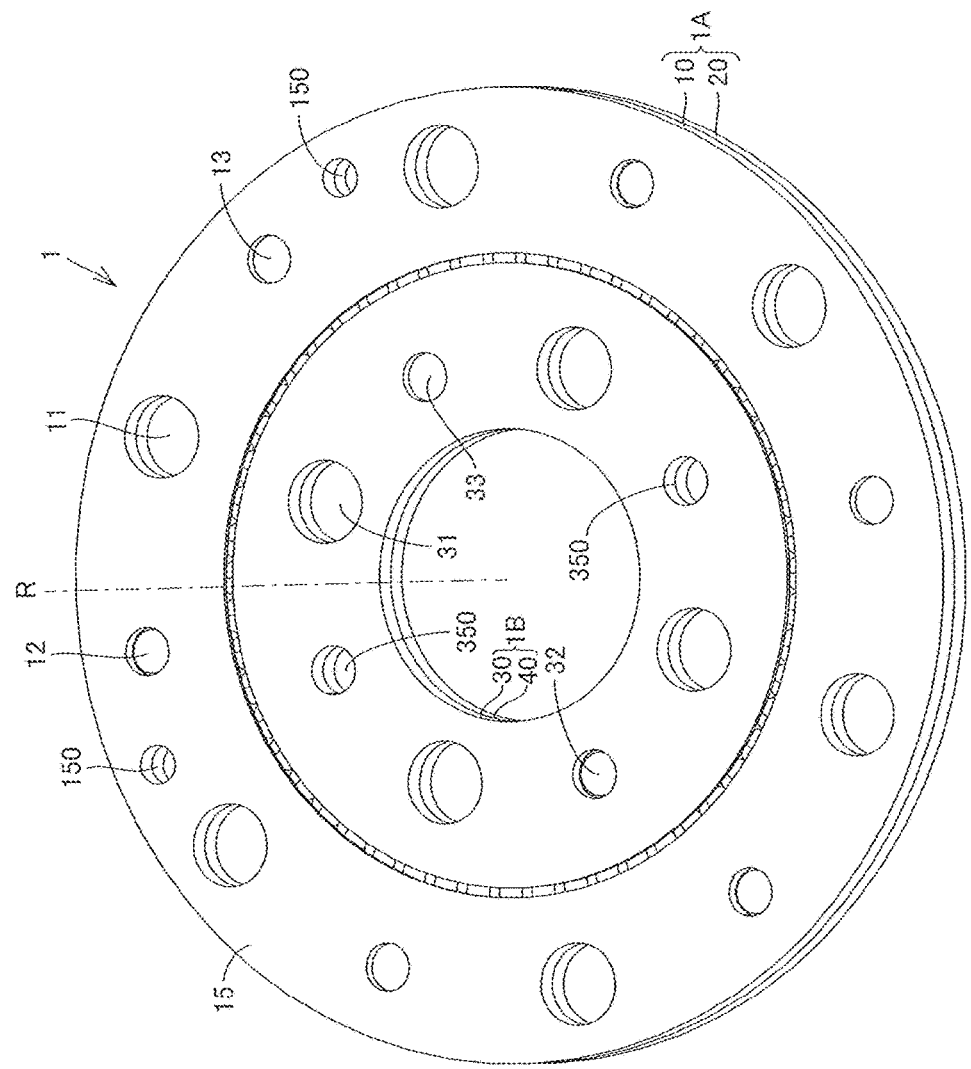
FIG. 15 is a schematic perspective view showing the structure of a rolling bearing in Embodiment 5.
Figure 16:
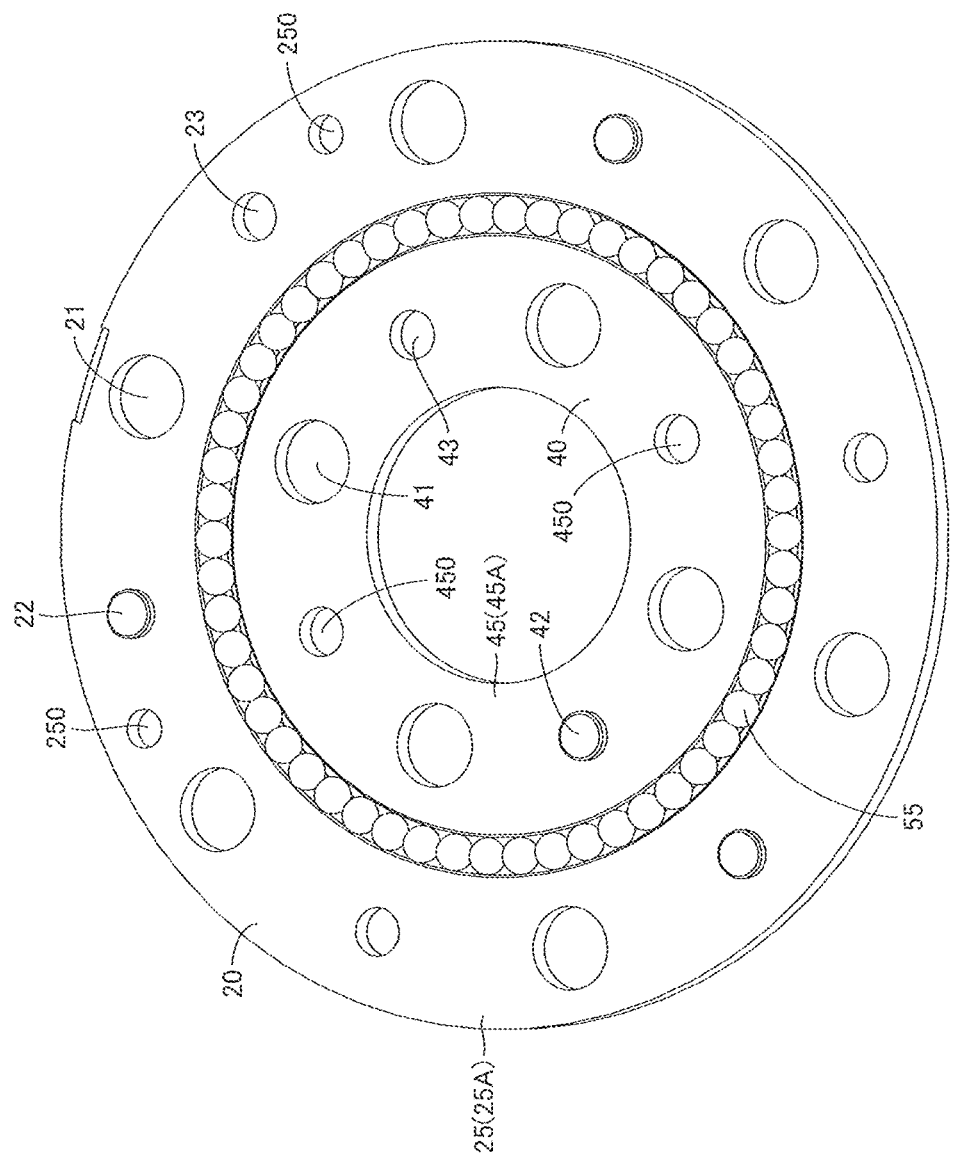
FIG. 16 is a schematic perspective view showing the structure of the rolling bearing in Embodiment 5.

Referring to FIG. 15, the outer ring 1A of the rolling bearing 1 consists of a first outer ring 10 and a second outer ring 20. The inner ring 1B consists of a first inner ring 30 and a second inner ring 40, FIG. 16 shows the rolling bearing 1 in FIG. 15 with the first outer ring 10 and the first inner ring 30 removed. Referring to FIG. 16, a plurality of balls 55 as the rolling elements are inserted between the second outer ring 20 and the second inner ring 40. As apparent in FIG. 15, the first outer ring 10 and the first inner ring 30 have their surfaces formed to be flat without any protruding portions that protrude in the direction of the central axis R. In the first outer ring 10, in addition to the mounting holes 11, the through holes 12, and the protruding portions 13 as the configuration described above, small through holes 150 are formed at two locations. The small through holes 150 are holes that penetrate in the thickness direction of the first outer ring 10. The small through holes 150 are formed at positions corresponding to small through holes 250 in the second outer ring 20. The holes formed by the small through holes 150 and 250 communicating with each other penetrate the rolling bearing 1 in the thickness direction. The small through holes 150, 250 may be used for positioning when mounting the rolling hearing 1 to a counterpart. That is, pins (not shown) can be inserted into the small through holes 150, 250 at two locations and fixed to predetermined positions on the counterpart, to thereby position the rolling bearing 1 and the counterpart. Similarly, in the first inner ring 30, in addition to the mounting holes 31, the through hole 32, and the protruding portion 33 as the configuration described above, small through holes 350 are formed at two locations. The small through holes 350 are holes that penetrate in the thickness direction of the first inner ring 30. The small through holes 350 are formed at positions corresponding to small through holes 450 in the second inner ring 40. The holes formed by the small through holes 350 and 450 communicating with each other penetrate the rolling bearing 1 in the thickness direction. The small through holes 350 and 450, likewise the small through holes 150 and 250, may be used for positioning when mounting the rolling bearing 1 to a counterpart.

Figure 17:
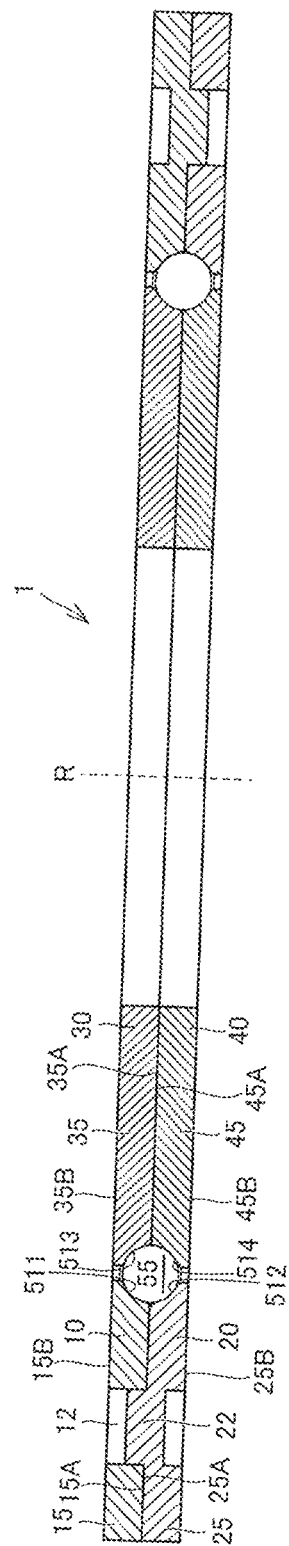
FIG. 17 is a schematic cross-sectional view showing the structure of the rolling bearing in Embodiment 5.

FIG. 17 is a cross-sectional view of the rolling bearing 1 of Embodiment 5. The first outer ring 10 and the second outer ring 20 are fixed with the through holes 12 in the first outer ring 10 and the protruding portions 22 in the second outer ring 20 fitted together. The surface 15A as one of the main surfaces of the first outer ring 10 is in contact with and fixed to the surface 25A as one of the main surfaces of the second outer ring 20. Although not apparent in FIG. 17, the first inner ring 30 and the second inner ring 40 are similarly fixed with the through hole 32 in the first inner ring 30 and the protruding portion 42 in the second inner ring 40 fitted together. The surface 35A as one of the main surfaces of the first inner ring 30 is in contact with and fixed to the surface 45A as one of the main surfaces of the second outer ring 40. A surface 15B as the surface of the first outer ring 10 and a surface 35B as the surface of the first inner ring are flat without any protruding portions in the direction of the central axis R. A surface 25B as the surface of the second outer ring 20 and a surface 45B as the surface of the second inner ring 40 are flat without any protruding portions in the direction of the central axis R.

Referring to FIGS. 15, 16, and 17, the first outer ring 10 includes a first portion 15 of a disk annular shape, and an inner circumferential surface of the first portion 15 includes a first rolling surface 511 on which the balls 55 roll. The second outer ring 20 includes a fourth portion 25 of a disk annular shape, and an inner circumferential surface of the fourth portion 25 includes a second rolling surface 512 on which the balls 55 roll. The first inner ring 30 includes a seventh portion 35 of a disk annular shape, and an outer circumferential surface of the seventh portion 35 includes a third rolling surface 513 on which the balls 55 roll. The fourth inner ring 40 includes a tenth portion 45 of a disk annular shape, and an outer circumferential surface of the tenth portion includes a fourth rolling surface 514 on which the balls 55 roll.

Figure 18:
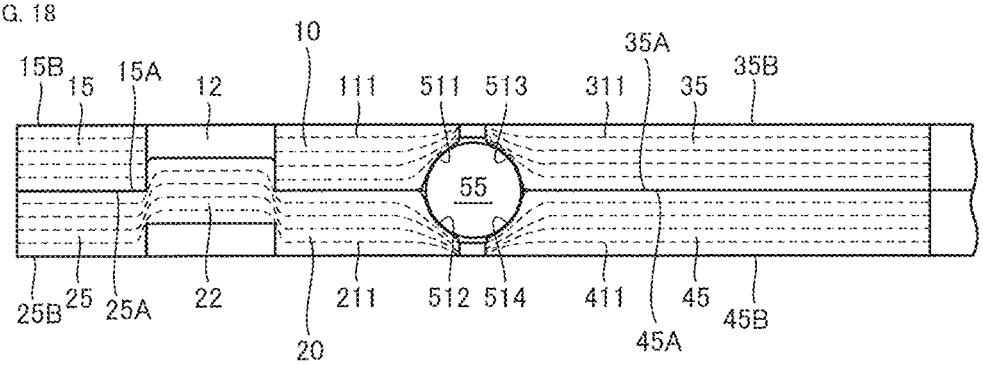
FIG. 18 is a schematic cross-sectional enlarged view showing the structure of the rolling bearing in Embodiment 5.

FIG. 18 is a partially enlarged view of FIG. 17, schematically illustrating the grain flows in the outer and inner rings. Referring to FIG. 18, in the first outer ring 10, grain flows 111 in the steel constituting the first outer ring 10 extend along the surfaces 15A and 15B of the first portion 15 and the first rolling surface 511. Similarly, in the second outer ring 20, grain flows 211 in the steel constituting the second outer ring 20 extend along the surfaces 25A and 25B of the fourth portion 25 and the second rolling surface 512. In the first inner ring 30, grain flows 311 in the steel constituting the first inner ring 30 extend along the surfaces 35A and 35B of the seventh portion 35 and the third rolling surface 513. In the second inner ring 40, grain flows 411 in the steel constituting the second inner ring 40 extend along the surfaces 45A and 45B of the tenth portion 45 and the fourth rolling surface 514. Such a configuration can be created by shaping the outer and inner rings by press working, for example, and then producing the rolling surfaces by known plastic working such as coining, for example.

Figure 19:
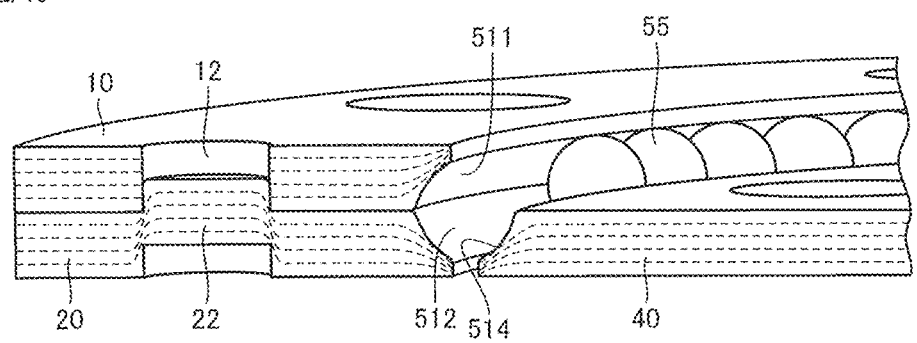
FIG. 19 is a schematic cross-sectional enlarged perspective view showing the structure of the rolling bearing in Embodiment 5.

Referring to FIGS. 17 and 18, in the cross section including the central axis R of the rolling bearing 1, the spacings between the grain flows in the vicinity of the rolling surfaces 511, 512, 513, and 514 are narrower than the spacings between the grain flows in other portions of the outer and inner rings (the main portions of the outer and inner rings). In other words, the spacings between the grain flows in the steels constituting the first outer ring 10, the second outer ring 20, the first inner ring 30, and the second inner ring 40 are narrower at the locations of the rolling surfaces 511, 512, 513, and 514 than in the other portions. With this configuration, it is estimated that the size of the crystal grains in the vicinity of the rolling surfaces 511, 512, 513 and 514 (where the spacings between the grain flows are narrower) is smaller than in the other portions. FIG. 19 is an enlarged cross-sectional perspective view of the rolling bearing 1 with the first inner ring 30 and some of the balls 55 removed, schematically illustrating the grain flows. Referring to FIG. 19, the ends of the grain flows are not exposed on the rolling surfaces 511 and 512. With the configuration as above, a thinner and more durable rolling bearing is obtained in which the strength of the rolling surfaces is more improved as the rolling elements do not contact the ends of the grain flows on the rolling surfaces.

Figure 20:
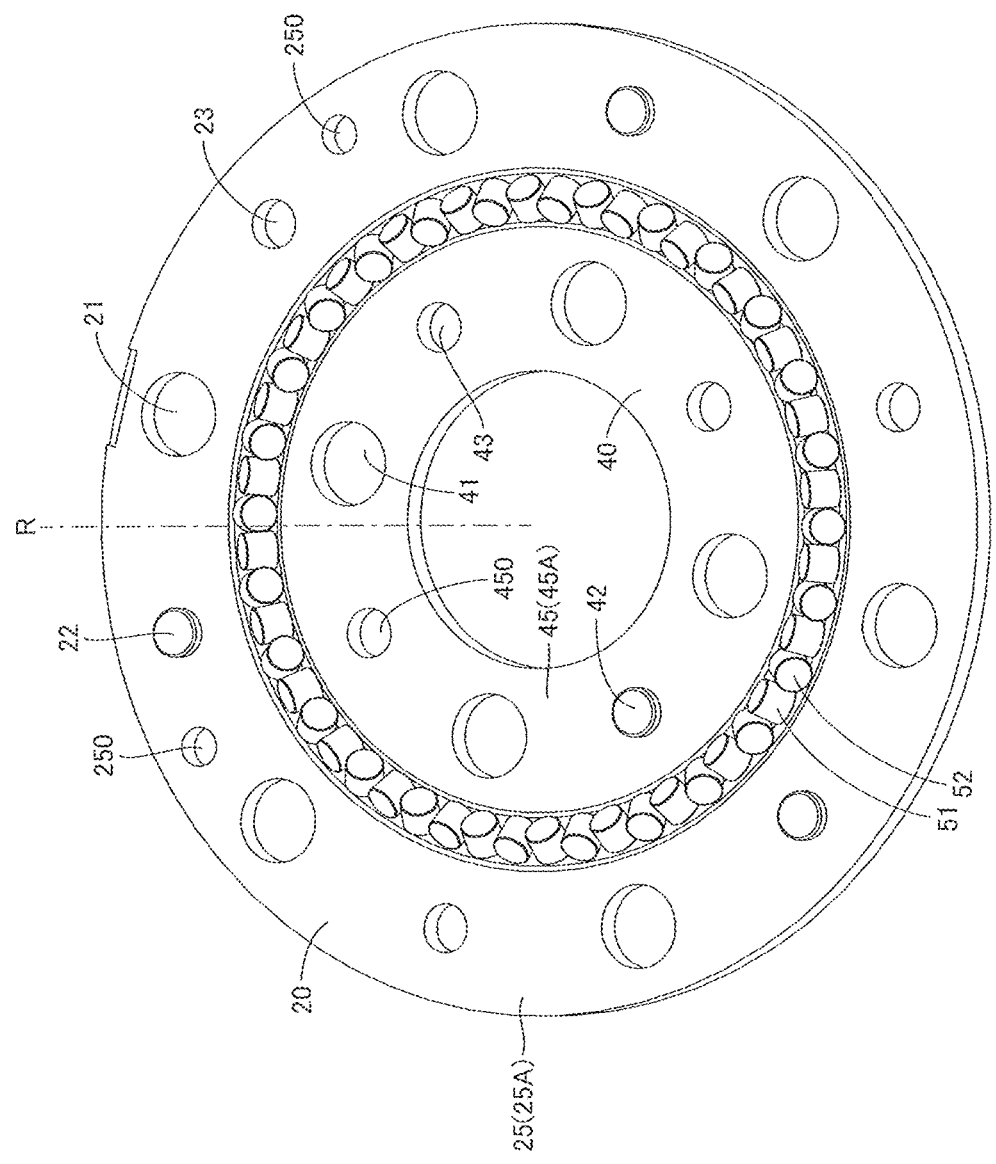
FIG. 20 is a schematic perspective view showing a variation of the rolling bearing in Embodiment 5.

FIGS. 20 and 21 show a variation of Embodiment 5. FIG. 20 is a diagram showing the rolling bearing 1 with the first outer ring 10 and the first inner ring 30 removed. FIG. 21 is an enlarged cross-sectional perspective view of the rolling bearing 1 with the first inner ring 30 and some of first and second rollers 51 and 52 removed, schematically illustrating the grain flows. The variation in FIGS. 20 and 21 differs from Embodiment 5 in that the rolling elements are the first and second rollers 51 and 52. Referring to FIG. 21, the first outer ring 10 includes the first portion 15 of a disk annular shape, and the inner circumferential surface of the first portion 15 includes the first rolling surface 511. The second outer ring 20 includes the fourth portion 25 of a disk annular shape, which is fixed to the first portion 15, and the inner circumferential surface of the fourth portion 25 includes the second rolling surface 512. The second inner ring 40 has the tenth portion 45 of a disk annular shape, and the outer circumferential surface of the tenth portion includes the fourth rolling surface 514. The first inner ring 30, which is not shown in the figure, is in contact with and fixed to the second inner ring 40 at its main surface. The third inner ring 30 has the seventh portion 35 of an annular shape, and the outer circumferential surface of the seventh portion 35 includes the third rolling surface 513, Referring to FIGS. 20 and 21, the first rollers 51 are arranged so as to be able to roll while contacting the first rolling surface 511 and the fourth rolling surface 514 at their outer circumferential surfaces 51A. The second rollers 52 are arranged so as to be able to roll while contacting the second rolling surface 512 and the third rolling surface 513 at their outer circumferential surfaces 52A.

Referring to FIG. 21, in a cross section including the central axis R (FIG. 20) of the rolling bearing 1, the grain flows 111 in the steel constituting the first outer ring 10 extend along the surfaces 15A and 15B of the first portion 15 and the first rolling surface 511. The grain flows 211 in the steel constituting the second outer ring 20 extend along the surfaces 25A and 25B of the fourth portion 25 and the second rolling surface 512. The grain flows 411 in the steel constituting the second inner ring 40 extend along the surfaces 45A and 45B of the tenth portion 45 and the fourth rolling surface 514. The first inner ring 30, although not shown, has a similar configuration.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: rolling bearing; 1A: outer ring; 1B: inner ring; 1C: roller; 10: first outer ring; 11, 21, 31, 41: mounting hole; 12, 23, 32, 43, 54A: through hole; 13, 22, 33, 42: protruding portion; 15: first portion; 15A, 18A, 25A, 28A, 35A, 38A, 45A, 48A: surface; 16: second portion; 16A, 17A, 26A, 27A, 36A, 36B, 37B, 46A, 46B, 47B: inner circumferential surface; 16B, 17B, 26B, 27B, 36A, 37A, 46A, 47A, 51A, 51B, 52A, 52B, 55A: outer circumferential surface; 17: third portion; 17C, 27B, 37C, 47B, 51B, 51C, 52B, 52C: end face; 18, 38: first labyrinth portion; 20: second outer ring; 25: fourth portion; 26: fifth portion; 27: sixth portion; 28, 48: second labyrinth portion; 29: bent portion; 30: first inner ring; 35: seventh portion; 36: eighth portion; 37: ninth portion; 40: second inner ring; 45: tenth portion; 46: eleventh portion; 47: twelfth portion; 51: first roller; 52: second roller; 53: separator; 54: retainer; 55: ball; 71: first member; 71A, 72A: screw hole; 72: second member; 73, 74: fixing bolt; 111, 211, 311, 411: grain flow; 150, 250, 350, 450: small through hole; 161: first surface; 162: second surface; 163: third surface; 261: fourth surface; 262: fifth surface; 263: sixth surface; 361: seventh surface; 362: eighth surface; 363: ninth surface; 461: tenth surface; 462: eleventh surface; 463: twelfth surface; 511: first rolling surface; 512: second rolling surface; 513: third rolling surface; and 514: fourth rolling surface.

The invention claimed is:

1. A rolling bearing comprising:
an outer ring made of steel;
an inner ring made of steel arranged on an inner circumferential side of the outer ring; and
a plurality of rolling elements arranged to be capable of rolling on an inner circumferential surface of the outer ring and an outer circumferential surface of the inner ring;
the outer ring including
   a first outer ring having an annular first rolling surface that constitutes the inner circumferential surface of the outer ring, and
   a second outer ring having an annular second rolling surface that has a common central axis with the first rolling surface and constitutes the inner circumferential surface of the outer ring, the second outer ring being arranged alongside the first outer ring in a first axis direction in which the central axis of the first rolling surface extends and being fixed to the first outer ring,
the inner ring including
   a first inner ring having an annular third rolling surface that has a common central axis with the first rolling surface, opposes the second rolling surface, and constitutes the outer circumferential surface of the inner ring, and
   a second inner ring having an annular fourth rolling surface that has a common central axis with the first rolling surface, opposes the first rolling surface, and constitutes the outer circumferential surface of the inner ring, a line segment connecting the fourth rolling surface and the first rolling surface intersecting a line segment connecting the second rolling surface and the third rolling surface in a cross section including the central axis of the first rolling surface, the second inner ring being arranged alongside the first inner ring in the first axis direction and being fixed to the first inner ring,
in the cross section including the central axis of the first rolling surface, grain flows in the steel constituting the first outer ring extending along the first rolling surface, grain flows in the steel constituting the second outer ring extending along the second rolling surface, grain flows in the steel constituting the first inner ring extending along the third rolling surface, and grain flows in the steel constituting the second inner ring extending along the fourth rolling surface,
wherein
the first outer ring includes
   a first portion having a disk annular shape,
   a second portion having a tubular shape and having an annular inner circumferential surface, the second portion extending from an inner edge of the first portion such that an inner diameter of the second portion decreases with increasing distance from the first portion in the first axis direction, and
   a third portion having a cylindrical shape, being connected to an end of the second portion opposite to the first portion in the first axis direction, and extending along the first axis direction,
the second outer ring includes
   a fourth portion having a disk annular shape and being fixed to the first portion such that a main surface of the first portion and a main surface of the fourth portion contact each other,
   a fifth portion having a tubular shape and having an annular inner circumferential surface, the fifth portion extending from an inner edge of the fourth portion to a side opposite to the second portion in the first axis direction, the fifth portion having an inner diameter decreasing with increasing distance from the fourth portion, and
   a sixth portion having a cylindrical shape, being connected to an end of the fifth portion opposite to the fourth portion in the first axis direction, and extending along the first axis direction to a side opposite to the third portion,
the first inner ring includes
   a seventh portion having a disk annular shape,
   an eighth portion having a tubular shape and having an annular outer circumferential surface, the eighth portion extending from an outer edge of the seventh portion such that an outer diameter of the eighth portion increases with increasing distance from the seventh portion in the first axis direction, and
   a ninth portion having a cylindrical shape, being connected to an end of the eighth portion opposite to the seventh portion in the first axis direction, and extending along the first axis direction,
the second inner ring includes
   a tenth portion having a disk annular shape and being fixed to the seventh portion such that a main surface of the seventh portion and a main surface of the tenth portion contact each other,
   an eleventh portion having a tubular shape and having an annular outer circumferential surface, the eleventh portion extending from an outer edge of the tenth portion to a side opposite to the eighth portion in the first axis direction such that an outer diameter of the eleventh portion increases with increasing distance from the tenth portion, and
   a twelfth portion having a cylindrical shape, being connected to an end of the eleventh portion opposite to the tenth portion in the first axis direction, and extending along the first axis direction to a side opposite to the ninth portion,
the inner circumferential surface of the second portion includes the first rolling surface,
the inner circumferential surface of the fifth portion includes the second rolling surface,
the outer circumferential surface of the eighth portion includes the third rolling surface, and
the outer circumferential surface of the eleventh portion includes the fourth rolling surface.

2. The rolling bearing according to claim 1, wherein
the rolling elements include first rollers and second rollers,
the first rollers and the second rollers are arranged alternately in a circumferential direction,
the first rollers have a central axis intersecting a central axis of the second rollers,
the first rollers are arranged so as to be able to roll on the first rolling surface and the fourth rolling surface, and
the second rollers are arranged so as to be able to roll on the second rolling surface and the third rolling surface.

3. The rolling bearing according to claim 2, wherein
in a cross section including the central axis of the first roller, an effective contact length L1 between an outer circumferential surface of the first roller and the first rolling surface and an effective contact length L2 between the outer circumferential surface of the first roller and the fourth rolling surface are not less than 0.5 times and not more than 0.9 times a length of the first roller in the axial direction, and in a cross section including the central axis of the second roller, an effective contact length L3 between an outer circumferential surface of the second roller and the second rolling surface and an effective contact length L4 between the outer circumferential surface of the second roller and the third rolling surface are not less than 0.5 times and not more than 0.9 times a length of the second roller in the axial direction.

4. The rolling bearing according to claim 1, wherein
the rolling elements are balls, and
the rolling elements are arranged so as to be able to roll on the first rolling surface, the second rolling surface, the third rolling surface, and the fourth rolling surface.

5. The rolling bearing according to claim 1, wherein
in a cross section including the central axis of the first rolling surface, the main surface of the first portion on the side in contact with the fourth portion and the first rolling surface are connected via a curved first region,
the main surface of the fourth portion on the side in contact with the first portion and the second rolling surface are connected via a curved second region, and
an annular space is formed, enclosed by the first region, the second region, and the rolling elements.

6. The rolling bearing according to claim 1, wherein in a cross section including the central axis of the first rolling surface, the first rolling surface and an inner circumferential surface of the third portion are connected via a curved third region, and the third rolling surface and an outer circumferential surface of the ninth portion are connected via a curved fourth region.

7. The rolling bearing according to claim 1, wherein in a cross section including the central axis of the first rolling surface, the first portion, the second portion, the third portion, the fourth portion, the fifth portion, the sixth portion, the seventh portion, the eighth portion, the ninth portion, the tenth portion, the eleventh portion, and the twelfth portion have a thickness less than 0.5 times a diameter of the rolling elements.

8. The rolling bearing according to claim 1, wherein
an inner circumferential surface of the third portion and an outer circumferential surface of the ninth portion are located to oppose each other,
an inner circumferential surface of the sixth portion and an outer circumferential surface of the twelfth portion are located to oppose each other, and
in a cross section including the central axis of the first rolling surface, a distance in a radial direction between the third portion and the ninth portion is smaller than a thickness of the third portion, and a distance in the radial direction between the sixth portion and the twelfth portion is smaller than a thickness of the sixth portion.

9. The rolling bearing according to claim 1, wherein in a cross section including the central axis of the first rolling surface, the third portion and the ninth portion each have a length in the first axis direction that is greater than 1.5 times a thickness of the third portion, and the sixth portion and the twelfth portion each have a length in the first axis direction that is greater than 1.5 times a thickness of the sixth portion.

10. The rolling bearing according to claim 1, wherein the first outer ring further includes a labyrinth portion arranged at an end of the third portion opposite to the second portion in the first axis direction and bent radially inward of the third portion to oppose the ninth portion with a spacing therebetween, the spacing being smaller than a distance between the third portion and the ninth portion in the radial direction.

11. The rolling bearing according to claim 1, wherein the first inner ring further includes a labyrinth portion arranged at an end of the ninth portion opposite to the eighth portion in the first axis direction and bent radially outward of the ninth portion to oppose the third portion with a spacing therebetween, the spacing being smaller than a distance between the third portion and the ninth portion in the radial direction.

* * * * *